US007041270B2

(12) United States Patent
Hammel et al.

(10) Patent No.: US 7,041,270 B2
(45) Date of Patent: May 9, 2006

(54) PRETREATMENT AND REGENERATION OF OXIDES OF MANGANESE

(75) Inventors: Charles F. Hammel, Escondido, CA (US); Patrick A. Tuzinski, Bloomington, MN (US); Richard M. Boren, Bakersfield, CA (US)

(73) Assignee: Enviroscrub Technologies Corporation, Bloomington, MN (US)

( * ) Notice: Subject to any disclaimer, the term of this patent is extended or adjusted under 35 U.S.C. 154(b) by 651 days.

(21) Appl. No.: 10/328,490

(22) Filed: Dec. 23, 2002

(65) Prior Publication Data

US 2003/0219368 A1 Nov. 27, 2003

Related U.S. Application Data

(60) Provisional application No. 60/342,587, filed on Dec. 21, 2001.

(51) Int. Cl.
*C01G 45/00* (2006.01)
(52) U.S. Cl. ..................................................... 423/605
(58) Field of Classification Search ................. 423/605
See application file for complete search history.

(56) References Cited

U.S. PATENT DOCUMENTS

| 1,178,927 A | 11/1916 | Kaplan |
| 1,275,666 A | 8/1918 | Ellis et al. |
| 1,293,461 A | 2/1919 | Kaplan |
| 1,330,738 A | 2/1920 | Ellis et al. |
| 1,851,312 A | 3/1932 | Huff |
| 2,123,250 A | 7/1938 | Muller et al. |
| 2,486,530 A | 11/1949 | Jenness |
| 2,608,466 A | 8/1952 | Fox |
| 2,956,860 A | 10/1960 | Welsh |
| 2,984,545 A | 5/1961 | Tarbutton et al. |
| 3,011,867 A | 5/1961 | Welsh |
| 3,150,923 A | 9/1964 | Bienstock et al. |
| 3,226,192 A | 12/1965 | Atsukawa et al. |
| 3,251,649 A | 5/1966 | Atsukawa et al. |
| 3,330,096 A | 7/1967 | Zimmerley |
| 3,427,128 A | 2/1969 | Schmier |
| 3,723,598 A | 3/1973 | Spedden |
| 3,780,158 A | 12/1973 | Welsh |
| 3,798,310 A | 3/1974 | Atsukawa et al. |
| 3,898,320 A | 8/1975 | Atsukawa et al. |
| 3,933,128 A | 1/1976 | Cramer |
| 3,951,765 A | 4/1976 | Everett |
| 3,956,189 A | 5/1976 | Warshaw et al. |
| 3,957,949 A | 5/1976 | Senjo et al. |
| 3,981,971 A | 9/1976 | Saito et al. |
| 4,006,217 A | 2/1977 | Faber et al. |
| 4,008,169 A | 2/1977 | McGauley |
| 4,011,298 A | 3/1977 | Fukui et al. |
| 4,012,487 A | 3/1977 | Merkl |
| 4,014,982 A | 3/1977 | Paull et al. |
| 4,017,586 A | 4/1977 | Reeves |
| 4,029,752 A | 6/1977 | Cahn |
| 4,033,113 A | 7/1977 | Cramer |
| 4,070,441 A | 1/1978 | Pessel |
| 4,081,509 A | 3/1978 | Hishinuma et al. |
| 4,087,372 A | 5/1978 | Saitoh et al. |
| 4,091,075 A | 5/1978 | Pessel |
| 4,102,982 A | 7/1978 | Weir |
| 4,108,969 A | 8/1978 | Merkl |
| 4,112,053 A | 9/1978 | Sanada et al. |
| 4,123,499 A | 10/1978 | Welsh et al. |
| 4,123,507 A | 10/1978 | Hass |
| 4,153,429 A | 5/1979 | Matthews et al. |
| 4,162,207 A | 7/1979 | Boyer et al. |
| 4,164,545 A | 8/1979 | Scott |
| 4,233,188 A | 11/1980 | Gandhi et al. |
| 4,250,149 A | 2/1981 | Welsh |
| 4,276,268 A | 6/1981 | Welsh |
| 4,277,360 A | 7/1981 | Mellors et al. |
| 4,309,386 A | 1/1982 | Pirsh |
| 4,309,392 A | 1/1982 | Shaw et al. |
| 4,310,494 A | 1/1982 | Welsh |
| 4,369,108 A | 1/1983 | Bertolacini et al. |
| 4,369,130 A | 1/1983 | Bertolacini et al. |
| 4,369,167 A | 1/1983 | Weir, Jr. |
| 4,376,103 A | 3/1983 | Bertolacini et al. |

(Continued)

FOREIGN PATENT DOCUMENTS

DE 33 12 890 A1 10/1984

(Continued)

OTHER PUBLICATIONS

De Bruijn, et al, "Thermal Decomposition of Aqueous Manganese Nitrate Solutions", Thermal Analysis, ICTA, Berkhaeuser, Verlag, Basel, Boston, Stuttgart, 1980: 393-398.

(Continued)

*Primary Examiner*—Steven Bos
(74) *Attorney, Agent, or Firm*—Fredrikson & Byron, P.A.

(57) ABSTRACT

The invention relates to systems and processes for treating particulate oxides of manganese useful as oxidizing sorbents for capturing or removing target pollutants from industrial gas streams, including, but not limited to, nitrogen oxides ($NO_x$), sulfur oxide ($SO_x$), mercury (Hg), hydrogen sulfide ($H_2S$), other totally reduced sulfides (TRS), and oxides of carbon (CO and $CO_2$) gases. Oxides of manganese are washed an aqueous oxidizing solution, which may be adjusted as necessary to maintain the oxidizing solution a desired range of pH (acidity) and Eh (oxidizing potential) within the $MnO_2$ stability area for aqueous solutions. The resulting treated oxides of manganese are equally or more efficient as sorbents as the oxides of manganese processed with the invention.

12 Claims, 10 Drawing Sheets

U.S. PATENT DOCUMENTS

| | | |
|---|---|---|
| 4,381,991 A | 5/1983 | Bertolacini et al. |
| 4,400,362 A | 8/1983 | Lerner |
| 4,402,931 A | 9/1983 | Tanabe et al. |
| 4,411,878 A | 10/1983 | Welsh |
| 4,423,019 A | 12/1983 | Bertolacini et al. |
| 4,448,760 A | 5/1984 | Welsh |
| 4,450,148 A | 5/1984 | Welsh |
| 4,476,104 A | 10/1984 | Mellors |
| 4,479,877 A | 10/1984 | Guter |
| 4,497,902 A | 2/1985 | Bertolacini et al. |
| 4,500,281 A | 2/1985 | Beardmore |
| 4,542,116 A | 9/1985 | Bertolacini et al. |
| 4,550,098 A | 10/1985 | Gens |
| 4,551,254 A | 11/1985 | Imada et al. |
| 4,552,734 A | 11/1985 | Iannicelli et al. |
| 4,552,735 A | 11/1985 | Iannicelli et al. |
| 4,581,210 A | 4/1986 | Teller |
| 4,581,219 A | 4/1986 | Imada et al. |
| 4,713,225 A | 12/1987 | Iannicelli |
| 4,755,499 A | 7/1988 | Neal et al. |
| 4,798,711 A | 1/1989 | Neal et al. |
| 4,836,993 A | 6/1989 | Bertolacini et al. |
| 4,843,980 A | 7/1989 | Markham et al. |
| 4,871,522 A | 10/1989 | Doyle |
| 4,872,989 A | 10/1989 | Pirotta |
| 4,883,647 A | 11/1989 | Kainer et al. |
| 4,908,194 A | 3/1990 | Hooper |
| 4,915,922 A | 4/1990 | Filss |
| 4,921,689 A | 5/1990 | Walker et al. |
| 4,923,688 A | 5/1990 | Iannicelli |
| 4,925,633 A | 5/1990 | Doyle |
| 4,940,569 A | 7/1990 | Neal et al. |
| 4,944,878 A | 7/1990 | Lockridge et al. |
| 4,954,324 A | 9/1990 | Hooper |
| 5,000,930 A | 3/1991 | Boguslawski |
| 5,009,872 A | 4/1991 | Chuang et al. |
| 5,023,063 A | 6/1991 | Stiles |
| 5,059,406 A | 10/1991 | Sheth et al. |
| 5,112,796 A | 5/1992 | Iannicelli |
| 5,176,888 A | 1/1993 | Stiles |
| 5,192,515 A | 3/1993 | Gardner-Chavis et al. |
| 5,199,263 A | 4/1993 | Green et al. |
| 5,200,160 A | 4/1993 | Benson et al. |
| 5,246,554 A | 9/1993 | Cha |
| 5,277,890 A | 1/1994 | Wang et al. |
| 5,348,726 A | 9/1994 | Wang et al. |
| 5,366,710 A | 11/1994 | Chou et al. |
| 5,384,301 A | 1/1995 | Flytzani-Stephanopoulos et al. |
| 5,391,365 A | 2/1995 | Wang et al. |
| 5,439,658 A | 8/1995 | Johnson et al. |
| 5,456,892 A | 10/1995 | Yang et al. |
| 5,505,766 A | 4/1996 | Chang |
| 5,607,496 A | 3/1997 | Brooks |
| 5,658,544 A | 8/1997 | Goodes |
| 5,672,323 A | 9/1997 | Bhat et al. |
| 5,700,439 A | 12/1997 | Goyette et al. |
| 5,780,000 A | 7/1998 | Strickland |
| 5,798,088 A | 8/1998 | Dorchak et al. |
| 5,853,684 A | 12/1998 | Fang et al. |
| 5,888,926 A | 3/1999 | Biswas et al. |
| 6,010,666 A | 1/2000 | Kurokawa et al. |
| 6,039,783 A | 3/2000 | Lueck et al. |
| 6,066,590 A | 5/2000 | Horii et al. |
| 6,132,692 A | 10/2000 | Alix et al. |
| 6,162,530 A | 12/2000 | Xiao et al. |
| 6,214,304 B1 | 4/2001 | Rosenthal et al. |
| 6,605,263 B1 | 8/2003 | Alix et al. |
| 6,610,263 B1 * | 8/2003 | Pahlman et al. ......... 423/239.1 |
| 2003/0108466 A1 | 6/2003 | Alix et al. |
| 2003/0108469 A1 | 6/2003 | Alix et al. |
| 2003/0108472 A1 | 6/2003 | Duncan et al. |

FOREIGN PATENT DOCUMENTS

| | | |
|---|---|---|
| DE | OS 3731889 | 4/1989 |
| DE | 40 12 982 A11 | 10/1991 |
| DE | 19715 244 A1 | 10/1998 |
| EP | 0 428 389 A2 | 5/1991 |
| EP | 0 476 300 A1 | 3/1992 |
| JP | 08266859 | 10/1996 |
| WO | WO 86/02918 | 5/1986 |
| WO | WO 02/09852 A2 | 2/2002 |
| WO | WO 02/28513 A2 | 4/2002 |

OTHER PUBLICATIONS

Elvers, Barbara, "Manganese," Ullmans Encyclopedia of Industrial Chemistry, Basel, Switzerland? Ed., No Date.

Il'chenko, Kucha, Chernomordik, Andreeva, Ivabova, "Path and Products of Thermal Decomposition of Mn(NO3)2 in Aqueous Nitric Acid Solutions," Plenum Publishing Corp., 1985, Northwest Correspondence Polytechnic Institute, Zhurnal Prikladnoi Khimii, vol. 58, May 21, 1984: pp. 984-989.

Karlsson and Rosenberg, "Flue Gas Denitrification. Selective Catalytic Oxidation of NO and NO2 Am. Chem. Soc.", published in Ind. Chem. Process Des. Dev., 1984: No. 23, pp. 808-814.

Stiles, et al., "Selective Catalytic Reduction of NOx in the Presence of Oxygen," Ind. Chem. Res., 1994: 33, pp. 2259-2264.

Uno, et. al., "A New Dry Process of SO2 Removal From Flue Gas Proceedings," 7th world petroleum congress, vol. 9, pp. 289-295, Elsivier publishing Co, 1967.

Vadjic, et. al., "The Effect of MnO2 and Some Mn Salts on the Behaviour of SO2 in the Air," The Science of the Total Environment, 44 (Feb. 18, 1985) 245-251, Elsevier Publishers.

Kanungo, Parida and Sant, "Studies on MnO2—II: Relationship Between Physico . . . Activity . . . Synthetic Mn" Electrochemiica Acta, 26 (8), pp. 1147-1156, 1981? Dec. 15, 1980.

Lawn, et. al., "The Effects of High-Energy Milling on the Catalytic Behaviour of MnO2," Power Technology, 20 (1978) 207-210, Elsevier Sequoia, S.A.

Strobel and Charenton, "Influence of Foreign Cations on the Synthesis of Various Non-stoichiometric Forms of MnO2," Revue de Chimie Minerale, t. 23, (1986), pp. 125-137.

Parida, Kanungo and Sant, "Studies on MnO2—I: Chemical Composition, Microstructure, and Other Cjaracteristics of Some Synthetic MnO2 of Various Crystalline Modifications," Electrochemiica Acta, vol. 26, pp. 435-443, Pergamon Press Ltd., 1981, Jan. 2, 1980.

Pattanayak and Sitakara Rao, "Preparation and Thermal Stability of Manganese Oxides Obtained by Precipitation from Aqueous Manganese Sulphate Solution," Thermochimica Acta, 153, (1989) pp. 193-204, Elsivier Science Publishers B.V., Amsterdam.

R.M. McKenzie, "The synthesis of birnessite, cryptomelane, and some other oxides and hydroxides of manganese," Mineralogical Magazine, Dec. 1971, vol. 38, pp. 493-502.

Li, Rothfus, and Adey, "Effect of Macroscopic Properties of Manganese Oxides on Absorption of Sulphur Dioxide," Environmental Science and Technology, vol. 2, No. 8, 1968, pp. 619-621.

Kolta, Azim, and Girgis, "Application of B.E.T. Method to Differentiating Manganese Dioxide Modifications," J. Appl. Chem. Biotechnol, 1971, vol. 21, Jun., pp. 154-158.

Tarbutton, Jones, Gray and Smith, "Recovery of Sulphur Dioxide from Flue Gases," Industrial and Engineering Chemistry, vol. 49, No. 3, Mar. 1957, pp. 392-395.

Nohman, Duprez, Kappenstein, Mansour, and Zaki, "Preparation of Manganese Oxide Catalysts Using Novel NH4MnO4 and Manganese Hydroxide Precursors." Comparison of Unsupported and Alumina-Supported Catalysts. Preparation of Catalysts V, 1991, Elsevier Publishers, 1991, pp. 617-626.

Kiang, Koh D., Li, Kun, Rothfus, Robert R., "Kinetic Studies of Sulfur Dioxide Absorption by Manganese Dioxide," Dep. Chem. Eng., Carnegie-Mellon Univ., Pittsburgh, PA, Environ. Sci. Technol., 1976, vol. 10, No. 9, pp. 886-893.

Sherwood, Pigford, and Wilke, "The Reactions of NOx With Water and Aqueous Solutions," Mass Transfer, McGraw Hill, 1975, pp. 346-361.

Hypolito, Valarelli, Giovanoli, Netto, "Gibbs Free Energy of Formation of Synthetic Cryptomelane," Chimia 38 (1984) No. 12 (Dec.), pp. 427-429.

Myrkova, Andriiko, and Kuz'minskii, "Oxidation of Mn(II) Ions in Nitrate Solutions_Kinetic Study," Ukrainskii Khimicheskii Zhurnal, vol. 60, No. 7-8, pp. 540-544, 1994.

Kanungo and Sant, "Preparation and Properties of Manganese Dioxide for Dry Cells," J. Scient. Ind. Res., vol. 31, May 1972, pp. 264-272.

Kanungo, "Physicochemical Properties of MnO2 and MnO2-CuO and Their Relationship With the Catalytic Activity for H2O2 Decomposition and CO Oxidation," Journal of Catalysis, vol. 58, pp. 419-435, 1979.

Bricker, "Some Stability Relationships in the System Mn-O2-H2O and One Atmosphere Total Pressure," The American Mineralogist, vol. 50, Sep., 1965, pp. 1296-1354.

"Commercial Demonstration of the NOXSO SO2/NO2 Removal flue Gas Clean-up System," Quarterly Technical Progress Report No. 16 Contract No. DE-FC22-91PC90549, Dec. 1, 1994 through Feb. 28, 1995.

Kalagnanam, J. & Rubin ES, "Development of Integrated Environmental Control Model," Quarterly Progress Report DE-AC22-92PC91346-12 Oct. 1995.

Boris E. Reyes and Timothy R. Catshaw, "SCONOX™ Catalytic Absorption System," Goal Line Environmental Technologies Dec. 8, 1998.

Wu, Shu-Chuan, et al., "Use of Deep Sea Manganese Nodules as Catalysts for Reduction of Nitric Oxide with Ammonia," Atmospheric Environment, Pergamon Press (1972), vol. 6, pp. 309-317.

Kinetics of Mn(II) Ion Oxidation in Nitrate Solutions; (to be translated—Russian) ISSN 0041-6045 Jul./Aug., 1994, T. 60, N 8, pp. 540-544 ?.

Kijlstra, et. Al., "Mechanism of the SCR of NO by NH3 Over MnOx / Al2O3—Part I; Adsorption and Desorption of Single Reaction Components," Journal of Catalysis, 171, pp. 208-218, Jun. 2, 1997, article No. CA971788.

Kijlstra, et. al., "Mechanism of the SCR of NO by NH3 Over MnOx/Al2O3—Part II; Reactivity of Adsorbed NH3 and NO Complexes," Journal of Catalysis, 171, pp. 219-230, Jun. 2, 1997, article No. CA971789.

Kapteijn, et. al., "Alumina-Supported Manganese Oxide Catalysts—Part II: Surface Characterizaton and Adsorbtion of Ammonia and Nitric Oxide," Journal of Catalysis, 150, (May 12, 1994), pp. 105-116.

Singoredjo, Kapteijn, et. al., "Alumina-Supported Mn Oxides for the Low-Temp. SCR of NO with Ammonia Applied Catalysis B," Environmental, 1 (Aug. 5, 1992) 297-316.

Pourbaix, Moussard, Brenet, Van Muylder, "Manganese Atlas of Electrochemical Equilibria in Aqueous Solutions," pp. 286-293, National Association of Corrosion Engineers, Houston, TX., USA.

Picquet and Davis, "A New Generation of CMD Tailored for Specific Applications Proceedings," The Electrochemical Society, v. 85-4, p. 247-261 1985.

Mourad, et. al., "Preparation and Characterization of Doped Manganese Dioxides," Journal of Applied Electrochemistry 10 (1980?) pp. 309-313 May 11, 1979.

Yamashita, Takemura, Konishi, and Kozawa, "BET Surface Area Measurements for I.C. and IBA MnO2," Samples Progress in Batteries and Solar Cells, vol. 7, (1988), IBA Hawaii Meeting Paper, pp. 66-72.

Xiao, P.R. Strutt, M. Benaissa, H. Chen, and B.H. Kear, "Synthesis of High Active-Site Density Nanofiberous MnO2-Base Materials. . ." Inframat Corp., North Haven, CT., Nanostructural Material (1998), 10 (6), pp. 1051-1061, CODEN: NMAEE7; ISSN:0965-9773 T.D.

Akiya Kozawa, "A New Hypothesis to Explain Unusual Gas Adsorption Behaviour by MnO2," Progress in Batteries and Solar Cells, vol. 7, (1988), IBA Hawaii Meeting Paper, pp. 59-64.

Fernandes, Desai and Dalal, "Studies on Chemically-Precipitated Mn(IV) Oxides IV: Effect of Dopants / Impurities on the Discharge Behaviour of CMD in Alkaline Medium and the Applicability of the Atlung-Jacobson model to the (MnO2)1-r(MnOOH)r System," Journal of Applied Electrochemistry, 15, (1985), pp. 351-363.

Williams, Morosin and Graham, "Influence of Shock Compression on the Specific Surface Area of Inorganic Powders," Chemical and Nuclear Engineering, Univ. of New Mexico, Albuquerque, NM, pp. 1013-1022, no date.

Pourbaix, Moussard, Brenet, Van Muylder, "Nitrogen—Atlas of Electrochemical Equilibria in Aqueous Solutions," Atlas of Electrochemical Equilibria in Aqueous Solutions, pp. 493-503, National Association of Corrosion Engineers, Houston, TX, USA, no date.

Pourbaix, Moussard, Brenet, Van Muylder, "Sulphur—Atlas of Electrochemical Equilibria in Aqueous Solutions," Atlas of Electrochemical Equililbria in Aqueous Solutions, pp. 545-553, National Association of Corrosion Engineers, Houston, TX, USA, no date.

Clapper, TW, "Manganese," Encyclopedia of Chemical Processing and Design, 1988, pp. 102-107.

Kapteijn, Singoredjo, and Andreini, "Activity and Selectivity of Pure Mn Oxides in the SCR of NO with NH4," Applied Catalysis B: Environmental, 3 (1994) 173-189, Elsevier Science Publishers.

Ambrose, Covington and Thirsk, "Electrode Potentials and related Properties of Some Potassium-Containing alpha Manganese Dioxides," Power Sources, 1970, 2, pp. 303-318.

Shen, Zerger, DeGuzman, Suib, McCurdy, Potter, and O'Young, "Manganese Oxide Octahedral Molecular Sieves: Preparation, Characterization, and Applications," Science, vol. 260, Apr. 1993, pp. 511-515.

Bystrom and Bystrom, "The Crystal Structure of Hollandite, the Related Manganese Oxide Minerals, and alpha-MnO2," Acta. Cryst., (1950), vol. 3, pp. 146-154.

Wadsley, A.D., "A Hydrous Manganese Oxied with Exchange Properties," J. Am. Chem. Soc., 1950, vol. 72, pp. 1781-1784.

Xiao, Bokhimi, Benaissa, Perez, Strutt, Yacaman, "Microstructural Characteristics of Chemically Processed Manganese Oxied Nanofibers," Acta Mater., vol. 45, No. 4, pp. 1685-1693, 1997.

Giovanoli, "A Review on Structural Data of Electrochemical and Chemical MnO2 (EMD and CMD)," Manganese Dioxide Symposium, vol. 2, Tokyo, 1980, pp. 113-133.

Mantell, C.L., "Persulfates," Industrial Electrochemistry, Chemical Engineering Series, 3rd edition, 1950, McGraw-Hill, pp. 110-112.

?, "Peroxodisulfates," (Do not know book title), vol. 18, pp. 217-219, "Peroxides and Compounds, (Inorganic)", No Date.

Post, Jeffery E., "Manganese oxide minerals: Crystal structures and economic and environmental significance," Proc. Nat'l. Acad. Sci. USA, vol. 96, pp. 3447-3454, Mar. 1999 colloquium paper.

Powerspan Corp., Powerspan System Overview: ECO™Technology (Electro-Catalytic Oxidation) www.powerspancorp.com/news/release-11.shtml downloaded Jan. 11, 2002.

Kaptijn, F., et al., "Activity and Selectivity of Pure Manganese Oxides in the Selective Catalytic reduction of nitric oxide with ammonia," Applied Catalysis B: Environmental, 3 (1994) 173-189, Elsevier Science, B.V., Amsterdam.

Kapteijn, et. al., "Alumina-Supported Manganese Oxide Catalysts—Part I: Characterization: Effect Precursor and Loading," Journal of Catalysis, 150, pp. 94-104, Apr. 13, 1994.

S. Lompart, L.T. Yu, J.C. Mas, A. Mendibourne and R. Vignaud, "Oxygen-Regeneration of Discharged Manganese Dioxide Electrode Part I: General Phenomena Observed on Thick Powder Electrodes," Journal of the Electrochemical Society, Electrochemical Science and Technology, Feb., 1990, vol. 137,pp. 371-376.

Yoshio, Murkami, Kurimoto, Noguchi and Kozawa, "Synthesis of EMD for Primary and Secondary Lithium Batteries," Denki Kagaku, 61, No. 12 (1993), p. 1449.

P.C. Picquet and Jay Y. Welsh, "A Broader Application of Chemical Manganese Dioxide in the Battery Industry," New Materials and New Processes, vol. 2 (1983) pp. 12-18.

J. Brenet, P.C. Piquet, and J.Y. Welsh, "An Interpretation of the Specific Reactivity of MnO2 Having a Gamma or Gamma-Rho Crystal Structure," The Electrochemical Society, Inc., Manganese Dioxide Symposium, vol. 2 Tokyo, 1980, pp. 214-243.

Burns and Burns, "Structural Relationships Between the Manganese (IV) Oxides," Manganese Dioxide Symposium, vol. 1, Cleveland, 1975, paper 16, pp. 306-327.

Malati, "The Solid State Properties of Manganese Dioxides," Chemistry and Industry, vol. 24, Apr., 1971, pp. 446-451.

Fernandes, Desai, and Dalal, "Studies on Chemically-Precipitated Mn(IV) Oxides-I," Electrochimia Acta, vol. 28, No. 3, pp. 309-315, 1983.

* cited by examiner

TREATMENT OF VIRGIN OXIDES OF MANGANESE SORBENT

TREATMENT OF LOADED OXIDES OF MANGANESE SORBENT

NO$_X$ Loading of Virgin Unreacted Oxides of Manganese Sorbent Following Treatment with an Oxidizing Aqueous Rinse as Defined in Applicants Invention.

SO$_X$ Loading of Virgin Unreacted Oxides of Manganese Sorbent Following Treatment with an Oxidizing Aqueous Rinse as Defined in Applicants Invention.

NO$_X$ Loading of Preveiously Loaded Oxides of Manganese Sorbent Following Treatment with an Oxidizing Aqueous Rinse as Defined in Applicants Invention.

SO_X Loading of Preveiously Loaded Oxides of Manganese Sorbent Following Treatment with an Oxidizing Aqueous Rinse as Defined in Applicants Invention.

TREATMENT OF VIRGIN OXIDES OF MANGANESE SORBENT

TREATMENT OF LOADED OXIDES OF MANGANESE SORBENT

POURBAIX DIAGRAM AT 25° C WITH 1x10⁰ DISSOLVED MANGANESE CONCENTRATOIN

POURBAIX DIAGRAM AT 25° C WITH $1 \times 10^{-6}$ DISSOLVED MANGANESE CONCENTRATION

PRETREATMENT AND REGENERATION OF OXIDES OF MANGANESE

RELATED APPLICATIONS

This application claims priority to U.S. Provisional Application No. 60/342,587 filed Dec. 21, 2001, which is incorporated herein by reference.

FIELD OF THE INVENTION

The invention relates to systems and processes for treating oxides of manganese that may be utilized as a sorbent for capture and removal of target pollutants from industrial and other gas streams. Further, the invention relates to pollution removal systems incorporating such methods and apparatus and to oxides of manganese, oxides of manganese sorbent particles, and oxides of manganese filter cake formed by the processes of the invention.

BACKGROUND OF THE INVENTION

The element manganese (Mn) may exist in six different valence (oxidation) states. Of particular interest and usefulness in the Pahlman™ systems and processes are those oxides of manganese having valence states of +2, +3, and +4, which correspond to the oxides MnO, $Mn_2O_3$, and $MnO_2$. The oxide $MnO_4$ is probably a solid-solution of both the +2 and +3 states.

A characteristic of most oxides of manganese species is non-stoichiometry; that is, most oxides of manganese molecules or $MnO_2$ species typically contain on average less than the theoretical number of 2 oxygen atoms, with numbers more typically ranging between 1.5 to 2.0. The non-stoichiometry characteristic is thought to result from solid-solution mixtures of two or more oxide species, and exists in all but the beta ($\beta$), or pyrolusite, form of manganese dioxide. Oxides of manganese having the formula MnOX where X is about 1.5 to about 2.0 are particularly suitable for dry removal of target pollutants from gas streams. However, the most active types of oxides of manganese for use as a sorbent for target pollutant removal usually have the formula $MnO_{1.7 \text{ to } 1.95}$, which translates into manganese valence states of +3.4 to +3.9, as opposed to the theoretical +4.0 state. It is unusual for average valence states above about 3.9 to exist in most forms of oxides of manganese. The formula $MnO_2$, as used herein, symbolically represents all varieties of manganese dioxide including those with valence states ranging from +3 to +4, or $MnO_{1.5-2.0}$.

Oxides of manganese are known to exhibit several identifiable crystal structures, which result from different assembly combinations of their basic molecular structural units. These basic structural "building block" units are $MnO_6$ octahedra, which consist of one manganese atom at the geometric center, and one oxygen atom at each of the six apex positions of an octahedral geometrical shape. The octahedra may be joined together along their edges and/or corners, to form "chain" patterns, with void spaces ("tunnels"). Regular (and sometimes irregular) three-dimensional patterns consist of layers of such "chains" and "tunnels" of joined octahedra. These crystalline geometries are identified by characteristic x-ray diffraction (XRD) patterns. Most oxides of manganese are classifiable into one or more of the six fundamental crystal structures, which are called alpha ($\alpha$), beta ($\beta$), gamma ($\gamma$), delta ($\delta$), epsilon ($\epsilon$), and ramsdellite. Certain older literature also included rho ($\rho$) and lambda ($\lambda$) structures, which are now thought obsolete, due partly to improvements in XRD technique. Some (amorphous) forms of $MnO_2$ exhibit no crystalline structure.

Certain characteristics of oxides of manganese probably arise from the size and shape of voids within these crystalline patterns and from certain elements, and compounds, which may occupy the voids and appear to help prevent collapse of certain structures. Applicants believe that these characteristics in addition to the oxidation state may have and affect upon the loading capacity of oxides of manganese sorbent. Further, many oxides of manganese are hydrous, and include structurally bound water. This bound water may also contribute to chemical reactivity and possibly catalytic behavior of the species.

Some oxides of manganese have the ability to absorb oxygen from gas. Manganous oxide (MnO) will oxidize to $MnO_2$ in the presence of air, for example. Additionally, the dioxides are themselves oxidizers, they readily exchange oxygen in chemical reactions, and they are known to have catalytic properties. This oxygen exchange ability may be related to proton mobility and lattice defects common within most $MnO_2$ crystal structures. The oxidizing potential of $MnO_2$ is advantageously utilized in target pollutant removal in the Pahlman™ and other systems and processes. Target pollutants, such as $NO_x$ and $SO_2$ gases, mercury (Hg) and other pollutants, require oxidation of the species prior to reaction with $MnO_2$ sorbent to form reaction products, such as manganese sulfates and nitrates, mercury compounds, and other corresponding reaction products, in order for them to be captured and removed from gas stream.

Manganese compounds are soluble in water in the +2 valence state, but not in the +4 state. Therefore $Mn^{+2}$ compounds, including MnO are readily soluble in aqueous solutions, as opposed to $MnO_2$. During the formation of reaction products such as manganese nitrates and sulfates, the manganese is reduced from about the +4 state to the +2 state. This property allows the reaction products formed on the surface of oxides of manganese sorbent particles to be readily dissolved and removed from the sorbent particles in aqueous solutions by disassociation into sulfate, nitrate, and $Mn^{+2}$ ions.

Manganese dioxides are divided into three origin-based categories, which are: 1) natural (mineral) manganese dioxide (NMD), 2) chemical manganese dioxide (CMD), and 3) electrolytic manganese dioxide (EMD). As implied, NMD occurs naturally as various minerals, which may be purified by mechanical or chemical means. The most common form of NMD is pyrolusite ($\beta$-$MnO_2$), which is inexpensive, but has rather low chemical activity and therefore low pollutant loading capacity. CMD and EMD varieties are synthetic. EMD is produced primarily for the battery industry, which requires relatively high bulk density (which often results from relatively large, compact particles), relatively high purity, and good electrochemical activity. Though useful as a sorbent, characteristics such as low surface area and large compact particle size make EMD somewhat inferior to CMD for gas removal applications, despite its good electrochemical activity. Chemically synthesized oxides of manganese of all kinds falls into the CMD category and includes chemically treated oxides of manganese. In chemical synthesis, a great deal of control is possible over characteristics such as particle size and shape, porosity, composition, surface area, and bulk density in addition to electrochemical or oxidation potential. It is believed that these characteristic contribute the loading capacity of some oxides of manganese.

EnviroScrub Technologies Corporation has developed pollutant removal systems and processes utilizing dry and wet removal techniques and combinations thereof, incorporating the use of oxides of manganese as a sorbent. These systems and processes, commonly known as Pahlman™ systems and processes are the subject of co-pending U.S. patent application Ser. Nos. 09/919,600, 09/951,697, 10/044,089 and 10/025,270, the disclosures of which are incorporated herein. High target pollutant removal efficiencies have been obtained utilizing the Pahlman™ systems and processes with oxides of manganese as the sorbent. Due to pollutant loading during the removal process, the Pahlman™ system or some of its system components must be periodically taken off-line so that sorbent may be removed for regeneration and recovery of useful by-products. The frequency of such disruptions and related downtime could be decreased if it were possible to increase the loading capacity of the sorbent. It would therefore be desirable to enhance the loading capacities of the oxides of manganese in order to extend the period of sorbent use and its loading capacity. Applicants have developed methods of treating virgin oxides of manganese and of recycle processing of loaded oxides of manganese with oxidants or oxidizers that result in treated oxides of manganese having enhanced or increased loading capacity.

SUMMARY OF THE INVENTION

Figure 1:
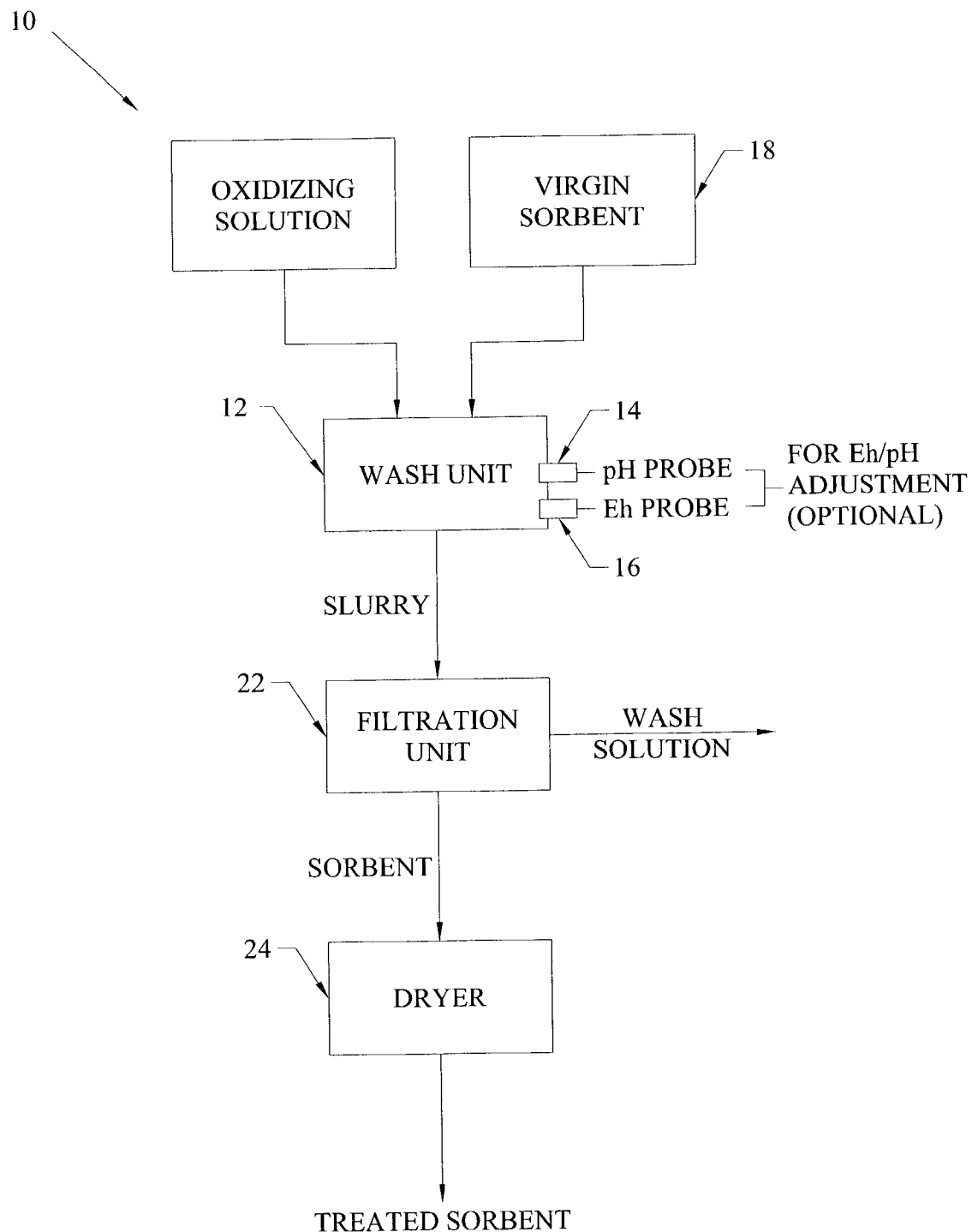
FIG. 1 is a block flow diagram depicting an embodiment of a treatment system and method of the invention.

The invention relates to systems and processes for treatment of oxides of manganese that may be utilized as a sorbent for removal of target pollutants from a gas stream.

An embodiment of a process for pretreatment of virgin oxides of manganese for use as a sorbent to remove target pollutants from a gas stream comprises the steps of washing virgin oxides of manganese in wash unit with an aqueous oxidizing solution, the solution having Eh and pH values within the $MnO_2$ stability area; and filtering the washed oxides of manganese to form a filtrate and a pretreated oxides of manganese filter cake, the oxides of manganese of the filter cake having a pollutant loading capacity greater than the pollutant loading capacity of the virgin oxides of manganese.

Another embodiment of a process for pretreatment of virgin oxides of manganese for use as a sorbent to remove target pollutants from a gas stream comprises the steps of washing virgin oxides of manganese in a wash unit with an aqueous oxidizing solution, the solution having Eh and pH values within the $MnO_2$ stability area; monitoring and adjusting the pH and/or the Eh values of the solution so as to maintain the Eh and pH values of the solution within the $MnO_2$ stability area; and filtering the washed oxides of manganese to form a filtrate and a pretreated oxides of manganese filter cake, the oxides of manganese of the filter cake having a pollutant loading capacity greater than the pollutant loading capacity of the virgin oxides of manganese. The monitoring and adjusting step may be carried out by a controller capable of individually or simultaneously monitoring and adjusting system operational parameters, the controller providing integrated control of within the wash unit of the temperature, Eh values, and pH values in order to maintain conditions of the aqueous oxidizing solution within the $MnO_2$ stability area.

An embodiment of a process for pretreatment of virgin oxides of manganese for use as a sorbent to remove target pollutants from a gas stream comprises the steps of washing virgin oxides of manganese in a rapid filtration wash unit with an aqueous oxidizing solution to form a filtrate and a pretreated oxides of manganese filter cake, the solution having Eh and pH values within the $MnO_2$ stability area; and removing the pretreated oxides of manganese filter cake from the rapid filtration unit, the oxides of manganese of the filter cake having a pollutant loading capacity greater that the pollutant loading capacity of the virgin oxides of manganese.

An embodiment of a process for regeneration of loaded oxides of manganese formed through reaction between unreacted oxides of a manganese and target pollutants in a gas stream comprises the steps of washing loaded oxides of manganese in a rapid filtration wash unit with an aqueous oxidizing solution having Eh and pH values within the $MnO_2$ stability area to form a filtrate and a regenerated oxides of manganese filter cake; and removing the regenerated oxides of manganese filter cake from the rapid filtration unit, the oxides of manganese of the filter cake having a pollutant loading capacity equal to or greater than the pollutant loading capacity of the unreacted oxides of manganese from which the loaded oxides of manganese are formed.

An embodiment of a process for regeneration of loaded oxides of manganese sorbent particles bearing a reaction product layer of the surface thereof formed during reaction between unreacted oxides of manganese sorbent particles and target pollutants in a gas stream in a pollution removal system comprises the steps of rapidly washing and filtering the loaded oxides of manganese sorbent particles in a rapid filtration wash unit with an aqueous oxidizing solution to dissolve the reaction product layer from the surface of the loaded oxides of manganese sorbent particles into the solution to form a filtrate and a regenerated oxides of manganese filter cake, the solution having Eh and pH values within the $MnO_2$ stability area; and removing the regenerated oxides of manganese filter cake from the rapid filtration unit, the oxides of manganese of the filter cake having a pollutant loading capacity equal to or greater than the pollutant loading capacity of the unreacted oxides of manganese sorbent particles from which the loaded oxides of manganese sorbent particles are formed.

The above processes may further comprise the steps of drying the filter cake; and comminuting and sizing the dried filter cake to provide oxides of manganese particles. The may alternative further comprise the steps of drying the filter cake; and comminuting and sizing the dried filter cake to provide oxides of manganese particles for introduction into a feeder or reaction chamber of a dry pollution removal system. In a further alternative, they processes may further comprise the steps of drying the filter cake; comminuting and sizing the dried filter cake to provide oxides of manganese particles for introduction into a feeder or reaction chamber of a dry pollution removal system; and introducing the comminuted and sized oxides of manganese particles into the feeder or reaction chamber. In yet a further alternative, the above described processes may further comprise the step of conveying the filter cake to a dryer configured to inject the a wet filter cake or a slurry of oxides of manganese sorbent into the flow of a gas stream prior to introduction into a reaction chamber of a pollutant removal system. In yet another further alternative, the above-described processes may further comprise the steps of conveying the filter cake to a dryer configured to inject the a wet filter cake or a slurry of oxides of manganese sorbent into the flow of a gas stream prior to introduction into a reaction chamber of a pollutant removal system; and injecting the wet filter cake or the slurry into the reaction chamber.

In the above-described processes the aqueous oxidizing solution contains an oxidizer. The oxidizer may be selected from the group consisting of hypochlorites, perchlolates, permanganates, oxygen ($O_2$), air, ozone, peroxides, persulfates, and combinations thereof.

13 An embodiment of a system for pretreatment of virgin oxides of manganese comprising a wash unit configured to hold and agitate a slurry of virgin oxides of manganese in an aqueous oxidizing solution, the solution have Eh and pH values within the $MnO_2$ stability area, the wash unit being optionally equipped with a pH probe, an Eh probe, and a temperature probe, the wash unit being further configured to receive the slurry of virgin oxides of manganese or to individually receive virgin oxides of manganese and the aqueous oxidizing solution; a filtration unit configured to receive the slurry from the wash unit and to filter the slurry to form a filtrate and a pretreated oxides of manganese filter cake; an aqueous oxidizing solution vessel containing a supply of aqueous oxidizing solution, the solution having Eh and pH values within the $MnO_2$ stability area, the vessel having a feeder configured to feed aqueous oxidizing solution to the wash unit and being optionally equipped with an Eh probe; an oxides of manganese vessel containing a supply of virgin oxides of manganese, the vessel having a feeder configured to feed oxides of manganese directly to the wash unit or, in conjunction with the aqueous oxidizing solution feeder to feed a slurry of virgin oxides of manganese to the wash unit; and a pH adjust vessel having a supply of acid or base or separate supplies of acid and base, the pH adjust vessel having a feeder configured to feed acid and/or base to the wash unit. The system of this embodiment may further comprise a controller capable of individually or simultaneously monitoring and adjusting system operational parameters, the controller providing integrated control within the wash unit of the temperature, Eh values, and pH values in order to maintain conditions of the aqueous oxidizing solution within the $MnO_2$ stability area.

This embodiment of a system for treatment of virgin or loaded oxides of manganese may further comprise a dryer for drying the filter cake; a device for comminuting and sizing the dried filter cake to form oxides of manganese particles; and a reaction chamber of a pollutant removal system into which the oxides of manganese particles are introduced to capture target pollutants from a gas, the reaction chamber being equipped with at least one target pollutant concentration reader for measuring target pollutant concentration of the gas as it exits the reaction chamber, the reader being in electronic communication with the controller for checking the loading performance of the oxides of manganese particles and signaling need for adjustment of operational parameters within the wash unit.

14 Another embodiment of a system for treatment of virgin or loaded oxides of manganese comprising a rapid filtration wash unit, the wash unit being configured to individually receive oxides of manganese and an aqueous oxidizing solution having a Eh and pH values within the $MnO_2$ stability area, the wash unit being further configured to rapidly remove the aqueous oxidizing solution from contact with the oxides of manganese forming a filtrate and a treated oxides of manganese filter cake; an aqueous oxidizing solution vessel containing a supply of aqueous oxidizing solution, the solution having Eh and pH values within the $MnO_2$ stability area, the vessel having a feeder configured to feed aqueous oxidizing solution to the wash unit and being optionally equipped with a probe selected from the group consisting of an Eh probe, a pH probe, a temperature probe, or any combination thereof; an oxides of manganese vessel containing a supply of virgin of loaded oxides of manganese, the vessel having a feeder configured to feed oxides of manganese to the wash unit; optionally, a oxidizer vessel containing a supply of oxidizer, the oxidizer vessel having feeder configured to feed oxidizer to the aqueous oxidizing solution vessel; and optionally, a pH adjust vessel having a supply of acid or base or separate supplies of acid and base, the pH adjust vessel having a feeder configured to feed acid and/or base to the aqueous oxidizing solution vessel. The system of this embodiment may further comprise a controller capable of individually or simultaneously monitoring and adjusting system operational parameters, the controller providing integrated control of the temperature, Eh values, and pH values within the aqueous oxidizing solution vessel in order to maintain conditions of the aqueous oxidizing solution within the $MnO_2$ stability area.

This embodiment of a system for treatment of virgin or loaded oxides of manganese may further comprise a dryer for drying the filter cake; a device for comminuting and sizing the dried filter cake to form oxides of manganese particles; and a reaction chamber of a pollutant removal system into which the oxides of manganese particles are introduced to capture target pollutants from a gas, the reaction chamber being equipped with at least one target pollutant concentration reader for measuring target pollutant concentration of the gas as it exits the reaction chamber, the reader being in electronic communication with the controller for checking the loading performance of the oxides of manganese particles and signaling need for adjustment of operational parameters within the aqueous oxidizing solution vessel.

Another embodiment of a system for pretreatment of virgin oxides of manganese comprises a wash unit configured to hold and agitate a slurry of virgin oxides of manganese in an aqueous oxidizing solution, the solution have Eh and pH values within the $MnO_2$ stability area, the wash unit being equipped with a pH probe, an Eh probe, and a temperature probe, the wash unit being further configured to receive the slurry of virgin oxides of manganese or to individually receive virgin oxides of manganese and the aqueous oxidizing solution; a filtration unit configured to receive the slurry from the wash unit and to filter the slurry to form a filtrate and a pretreated oxides of manganese filter cake; an aqueous oxidizing solution vessel containing a supply of aqueous oxidizing solution, the solution having Eh and pH values within the $MnO_2$ stability area, the vessel having a feeder configured to feed aqueous oxidizing solution to the wash unit and being equipped with an Eh probe;

an oxides of manganese vessel containing a supply of virgin oxides of manganese, the vessel having a feeder configured to feed oxides of manganese directly to the wash unit or, in conjunction with the aqueous oxidizing solution feeder to feed a slurry of virgin oxides of manganese to the wash unit; a pH adjust vessel having a supply of acid or base or separate supplies of acid and base, the pH adjust vessel having a feeder configured to feed acid and/or base to the wash unit; and a controller capable of individually or simultaneously monitoring and adjusting system operational parameters, the controller providing integrated control within the wash unit of the temperature, Eh values, and pH values in order to maintain conditions of the aqueous oxidizing solution within the $MnO_2$ stability area, the controller being electronic communication with the probes and feeders of the system.

This embodiment of a for pretreatment of virgin oxides of manganese may further comprise a dryer for drying the filter cake; a device for comminuting and sizing the dried filter cake to form oxides of manganese particles; and a reaction chamber of a pollutant removal system into which the oxides of manganese particles are introduced to capture target pollutants from a gas, the reaction chamber being equipped with at least one target pollutant concentration reader for measuring target pollutant concentration of the gas as it exits the reaction chamber, the reader being in electronic communication with the controller for checking the loading performance of the oxides of manganese particles and signaling need for adjustment of operational parameters within the wash unit.

18 Another embodiment of a system for treatment of virgin or loaded oxides of manganese comprises a rapid filtration wash unit, the wash unit being configured to individually receive oxides of manganese and an aqueous oxidizing solution having a Eh and pH values within the $MnO_2$ stability area, the wash unit being further configured to rapidly remove the aqueous oxidizing solution from contact with the oxides of manganese forming a filtrate and a treated oxides of manganese filter cake; an aqueous oxidizing solution vessel containing a supply of aqueous oxidizing solution, the solution having Eh and pH values within the $MnO_2$ stability area, the vessel having a feeder configured to feed aqueous oxidizing solution to the wash unit and being equipped with a probe selected from the group consisting of an Eh probe, a pH probe, a temperature probe, or any combination thereof; an oxides of manganese vessel containing a supply of virgin of loaded oxides of manganese, the vessel having a feeder configured to feed oxides of manganese to the wash unit; a oxidizer vessel containing a supply of oxidizer, the oxidizer vessel having feeder configured to feed oxidizer to the aqueous oxidizing solution vessel; a pH adjust vessel having a supply of acid or base or separate supplies of acid and base, the pH adjust vessel having a feeder configured to feed acid and/or base to the aqueous oxidizing solution vessel; and a controller capable of individually or simultaneously monitoring and adjusting system operational parameters, the controller providing integrated control of the temperature, Eh values, and pH values within the aqueous oxidizing solution vessel in order to maintain conditions of the aqueous oxidizing solution within the $MnO_2$ stability area, the controller being in electronic communication with the probes and feeders of the system.

This embodiment of a system for treatment of virgin or loaded oxides of manganese may further comprise a dryer for drying the filter cake; a device for comminuting and sizing the dried filter cake to form oxides of manganese particles; and a reaction chamber of a pollutant removal system into which the oxides of manganese particles are introduced to capture target pollutants from a gas, the reaction chamber being equipped with at least one target pollutant concentration reader for measuring target pollutant concentration of the gas as it exits the reaction chamber, the reader being in electronic communication with the controller for checking the loading performance of the oxides of manganese particles and signaling need for adjustment of operational parameters within the aqueous oxidizing solution vessel.

In the above-described systems the aqueous oxidizing solution contains an oxidizer. The oxidizer may be selected from the group consisting of hypochlorites, perchlolates, permanganates, oxygen ($O_2$), air, ozone, peroxides, persulfates, and combinations thereof.

The invention also relates to oxides of manganese, oxides of manganese particles, and oxides of manganese filter cakes formed by the above-described processes.

Oxides of manganese particles may be formed by a process for pretreatment of virgin oxides of manganese for use as a sorbent to remove target pollutants from a gas stream comprising the steps of washing virgin oxides of manganese in wash unit with an aqueous oxidizing solution, the solution having Eh and pH values within the $MnO_2$ stability area; filtering the washed oxides of manganese to form a filtrate and a pretreated oxides of manganese filter cake, the oxides of manganese of the filter cake having a pollutant loading capacity greater than the pollutant loading capacity of the virgin oxides of manganese; drying the filter cake; and comminuting and sizing the dried filter cake to form oxides of manganese particles.

Oxides of manganese particles may be formed by a process for pretreatment of virgin oxides of manganese for use as a sorbent to remove target pollutants from a gas stream, comprising the steps of washing virgin oxides of manganese in a wash unit with an aqueous oxidizing solution, the solution having Eh and pH values within the $MnO_2$ stability area; monitoring and adjusting the pH and/or the Eh values of the solution so as to maintain the Eh and pH values of the solution within the $MnO_2$ stability area; filtering the washed oxides of manganese to form a filtrate and a pretreated oxides of manganese filter cake, the oxides of manganese of the filter cake having a pollutant loading capacity greater than the pollutant loading capacity of the virgin oxides of manganese; drying the filter cake; and comminuting and sizing the dried filter cake to form oxides of manganese particles.

Oxides of manganese particles may be formed by a process for pretreatment of virgin oxides of manganese for use as a sorbent to remove target pollutants from a gas stream comprising the steps of washing virgin oxides of manganese in a rapid filtration wash unit with an aqueous oxidizing solution to form a filtrate and a pretreated oxides of manganese filter cake, the solution having Eh and pH values within the $MnO_2$ stability area; removing the pretreated oxides of manganese filter cake from the rapid filtration unit, the oxides of manganese of the filter cake having a pollutant loading capacity greater that the pollutant loading capacity of the virgin oxides of manganese; drying the filter cake; and comminuting and sizing the dried filter cake to form oxides of manganese particles.

Oxides of manganese particles may formed by a process for regeneration of loaded oxides of manganese formed through reaction between unreacted oxides of a manganese and target pollutants in a gas stream comprising the steps of washing loaded oxides of manganese in a rapid filtration wash unit with an aqueous oxidizing solution having Eh and pH values within the $MnO_2$ stability area to form a filtrate and a regenerated oxides of manganese filter cake; removing the regenerated oxides of manganese filter cake from the rapid filtration unit, the oxides of manganese of the filter cake having a pollutant loading capacity equal to or greater than the pollutant loading capacity of the unreacted oxides of manganese from which the loaded oxides of manganese are formed; drying the filter cake; and comminuting and sizing the dried filter cake to form oxides of manganese particles.

Oxides of manganese sorbent particles may formed by a process for regeneration of loaded oxides of manganese sorbent particles bearing a reaction product layer of the surface thereof formed during reaction between unreacted oxides of manganese sorbent particles and target pollutants in a gas stream in a pollution removal system, comprising the steps of rapidly washing and filtering the loaded oxides of manganese sorbent particles in a rapid filtration wash unit with an aqueous oxidizing solution to dissolve the reaction product layer from the surface of the loaded oxides of manganese sorbent particles into the solution to form a filtrate and a regenerated oxides of manganese filter cake, the solution having Eh and pH values within the $MnO_2$ stability area; removing the regenerated oxides of manganese filter cake from the rapid filtration unit, the oxides of manganese of the filter cake having a pollutant loading capacity equal to or greater than the pollutant loading capacity of the unreacted oxides of manganese sorbent particles from which the loaded oxides of manganese sorbent particles are formed; drying the filter cake; and comminuting and sizing the dried filter cake to form oxides of manganese particles.

Oxides of manganese filter cakes particles may be formed by a process for pretreatment of virgin oxides of manganese for use as a sorbent to remove target pollutants from a gas stream, comprising the steps of washing virgin oxides of manganese in a wash unit with an aqueous oxidizing solution, the solution having Eh and pH values within the $MnO_2$ stability area; monitoring and adjusting the pH and/or the Eh values of the solution so as to maintain the Eh and pH values of the solution within the $MnO_2$ stability area; and filtering the washed oxides of manganese to form a filtrate and a pretreated oxides of manganese filter cake, the oxides of manganese of the filter cake having a pollutant loading capacity greater than the pollutant loading capacity of the virgin oxides of manganese.

Oxides of manganese filter cake may be formed by a process for pretreatment of virgin oxides of manganese for use as a sorbent to remove target pollutants from a gas stream, comprising the step of washing virgin oxides of manganese in a rapid filtration wash unit with an aqueous oxidizing solution to form a filtrate and a pretreated oxides of manganese filter cake, the solution having Eh and pH values within the $MnO_2$ stability area; wherein the oxides of manganese of the pretreated oxides of manganese filter cake have a pollutant loading capacity greater that the pollutant loading capacity of the virgin oxides of manganese.

Oxides of manganese filter cake formed by a process for regeneration of loaded oxides of manganese formed through reaction between unreacted oxides of a manganese and target pollutants in a gas stream comprising the step of washing loaded oxides of manganese in a rapid filtration wash unit with an aqueous oxidizing solution having Eh and pH values within the $MnO_2$ stability area to form a filtrate and a regenerated oxides of manganese filter cake; wherein the oxides of manganese of the regenerated oxides of manganese filter cake have a pollutant loading capacity equal to or greater than the pollutant loading capacity of the unreacted oxides of manganese from which the loaded oxides of manganese are formed.

Oxides of manganese filter cake may be formed by a process for regeneration of loaded oxides of manganese sorbent particles bearing a reaction product layer of the surface thereof formed during reaction between unreacted oxides of manganese sorbent particles and target pollutants in a gas stream in a pollution removal system comprising the step of rapidly washing and filtering the loaded oxides of manganese sorbent particles in a rapid filtration wash unit with an aqueous oxidizing solution to dissolve the reaction product layer from the surface of the loaded oxides of manganese sorbent particles into the solution to form a filtrate and a regenerated oxides of manganese filter cake, the solution having Eh and pH values within the $MnO_2$ stability area; wherein the oxides of manganese in the regenerated oxides of manganese filter cake have a pollutant loading capacity equal to or greater than the pollutant loading capacity of the unreacted oxides of manganese sorbent particles from which the loaded oxides of manganese sorbent particles are formed.

In the processes for formation of the above-described oxides of manganese particles and oxides of manganese filter cakes, the aqueous oxidizing solution contains an oxidizer. The oxidizer may be selected from the group consisting of hypochlorites, perchlolates, permanganates, oxygen ($O_2$), air, ozone, peroxides, persulfates, and combinations thereof.

DETAILED DESCRIPTION OF PREFERRED EMBODIMENTS

The following definitions will be useful in understanding the invention disclosed herein:

"Reacted" or "loaded," as used interchangeably herein, refers in conjunction with "oxides of manganese" and/or "sorbent" to oxides of manganese or sorbent that has interacted with one or more target pollutants in a gas whether by chemical reaction, adsorption or absorption. The term does not mean that all reactive or active sites of the sorbent have been utilized as all such sites may not actually be utilized.

"Unreacted" or "virgin," as used interchangeably herein, refers in conjunction with "oxides of manganese" and/or "sorbent" to oxides of manganese or sorbent that has not interacted with target pollutants in a gas or gas stream.

"Nitrates of manganese," as used herein, refers to and includes the various forms of manganese nitrate, regardless of chemical formula, that may be formed through the chemical reaction between $NO_x$ and the sorbent and includes hydrated forms as well.

"Sulfates of manganese," as used herein, refers to and includes the various forms of manganese sulfate, regardless of chemical formula that may be formed through the chemical reaction between $SO_x$ and the sorbent and includes hydrated forms as well.

"Target pollutant," as used herein, refers to the pollutant or pollutants that are or are to be captured and removed from a gas stream.

"$MnO_2$ stability area," as used herein, refers to the region of thermodynamic stability for manganese dioxide delineated by Eh and pH values for aqueous solutions. More specifically, it refers to the region of thermodynamic stability for manganese dioxide delineated by Eh and pH values for aqueous solutions in an electrochemical stability diagram, such as presented by Pourbaix diagrams.

Oxides of manganese may be utilized for various applications. one such application is in the use as a sorbent for removal of target pollutants in gas streams. Examples of target pollutants that may be removed with an oxide of manganese sorbent, include but are not limited to, $NO_x$, $SO_x$, mercury (Hg) and some mercury compounds, $H_2S$ and other totally reduced sulfides (TRS), and oxides of carbon. As previously noted above, certain target pollutant removal systems and processes methods utilizing oxide of manganese sorbents and referred to as Pahlman™ systems and Pahlman™ processes are described and disclosed in co-pending U.S. patent application Ser. Nos. 09/919,600, 09/951,697, 10/044,089 and 10/025,270, all assigned to EnviroScrub Technologies Corporation, the assignee of this application. The disclosures of these four patent applications are incorporated herein by reference.

Oxides of manganese sorbents are introduced into these and other pollution removal systems and interact with the target pollutants in gas streams routed through the systems as a catalyst, a reactant, an absorbent or an adsorbent.

During such interaction in the process of pollutant removal, the oxidation (or valence) state of the oxides of manganese sorbent is reduced from its original state during reaction with the target pollutants. For example, where the target pollutants are $NO_x$ or $SO_x$, possibly through overall reactions such as the following:

$$SO_2 + MnO_2 \rightarrow MnSO_4 \qquad \text{Reaction (1)}$$

$$2NO + O_2 + MnO_2 \rightarrow Mn(NO_3)_2 \qquad \text{Reaction (2)}$$

In both of the reactions above, manganese (Mn) is reduced from the +4 valence state to +2 valence state during formation of the reaction products shown. It should be noted that the actual reactions may include other steps not shown, and that indicating Reactions 1 and 2 is not in any way intended to limit the scope of the invention, but is used only to illustrate the process.

Additionally, it is believed that reaction products, such as the salts of Reaction (1) and Reaction (2) above, form on the surfaces of the sorbent particles of oxides of manganese. These reactions may extend to some depth inside the sorbent particles. Applicants believe that formation of such reactions products occurs on the surfaces of the oxides of manganese particles, resulting in a layer or coating, which effectively isolates the covered portion of the particle surface and thereby prevents continued rapid reaction with additional target pollutants. Further, the oxidation state and thus the loading capacity of the oxides of manganese below the surface of the reaction product coating may be reduced during the pollutant removal, thus diminishing the loading capacity of sorbent even after the reaction product have been removed or disassociated into an aqueous solution.

Following reaction with the target pollutants, it is desirable for economic reasons to re-use the unreacted portions of the sorbent for subsequent cycles of pollutant gas removal. These unreacted portions may exhibit decreased loading capacity. In order to render reacted oxides of manganese effective for subsequent re-use as a gas sorbent with high removal efficiency, it is necessary to: (1) remove reaction products, such as salts from the sorbent particle surfaces and (2) restore or increase the target pollutant loading capacity of the oxides of manganese sorbent. Applicants have found that washing the loaded oxides of manganese in an aqueous oxidizing solution that has been adjusted to within the $MnO_2$ stability area can accomplish these requirements. Further, Applicants have found that loading capacity of virgin or unreacted sorbent can be increased by washing with aqueous oxidizing solutions.

Without being bound by theory, Applicants believe that the processing of oxides of manganese according to the invention in aqueous oxidizing solution systems maintained with the $MnO_2$ stability window may beneficially affect a number of sorbent characteristics. Such characteristics may include particle size and shape, crystalline structure or morphology, porosity, composition, surface area, bulk density electrochemical or oxidation potential or manganese valence states.

Regardless, the increased loading capacity is achieved with aqueous oxidizing solutions. Hypochlorites, such as sodium hypochlorite (NaOCl), have been found to be a suitable oxidizers for use in the aqueous oxidizing solutions, although many other oxidizers may also be suitable for this purpose. Other suitable oxidizers include, but are not limited to chlorates, such as sodium chlorate ($NaClO_3$), perchlorates such as sodium perchlorate ($Na_2ClO_4$), permanganates, such as potassium permanganate ($KMnO_4$), oxygen ($O_2$) or air, ozone ($O_3$), peroxides, such as $H_2O_2$, and persulfates, such as sodium peroxidisulfate ($Na_2S_2O_8$). The electrochemical potential of the aqueous oxidizing solution, and therefore the effectiveness of the treatment methods of the invention, depends, in part, upon the strength of the oxidizer and/or the concentration of the oxidizer in the solution.

Figure 9:
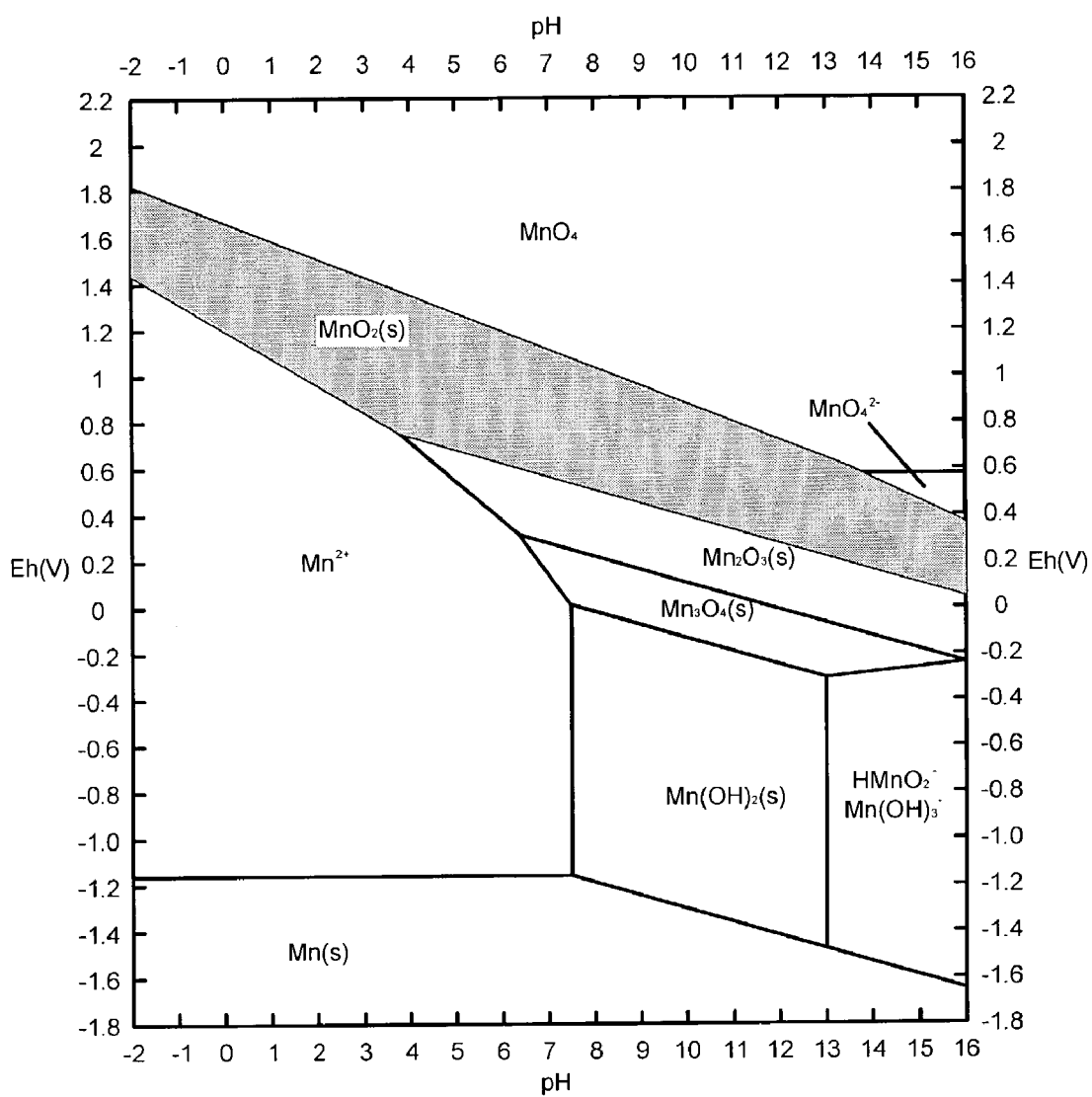
FIG. 9 is a Pourbaix diagram for an aqueous solution of 1 mole/liter manganese ion concentration.
Figure 10:
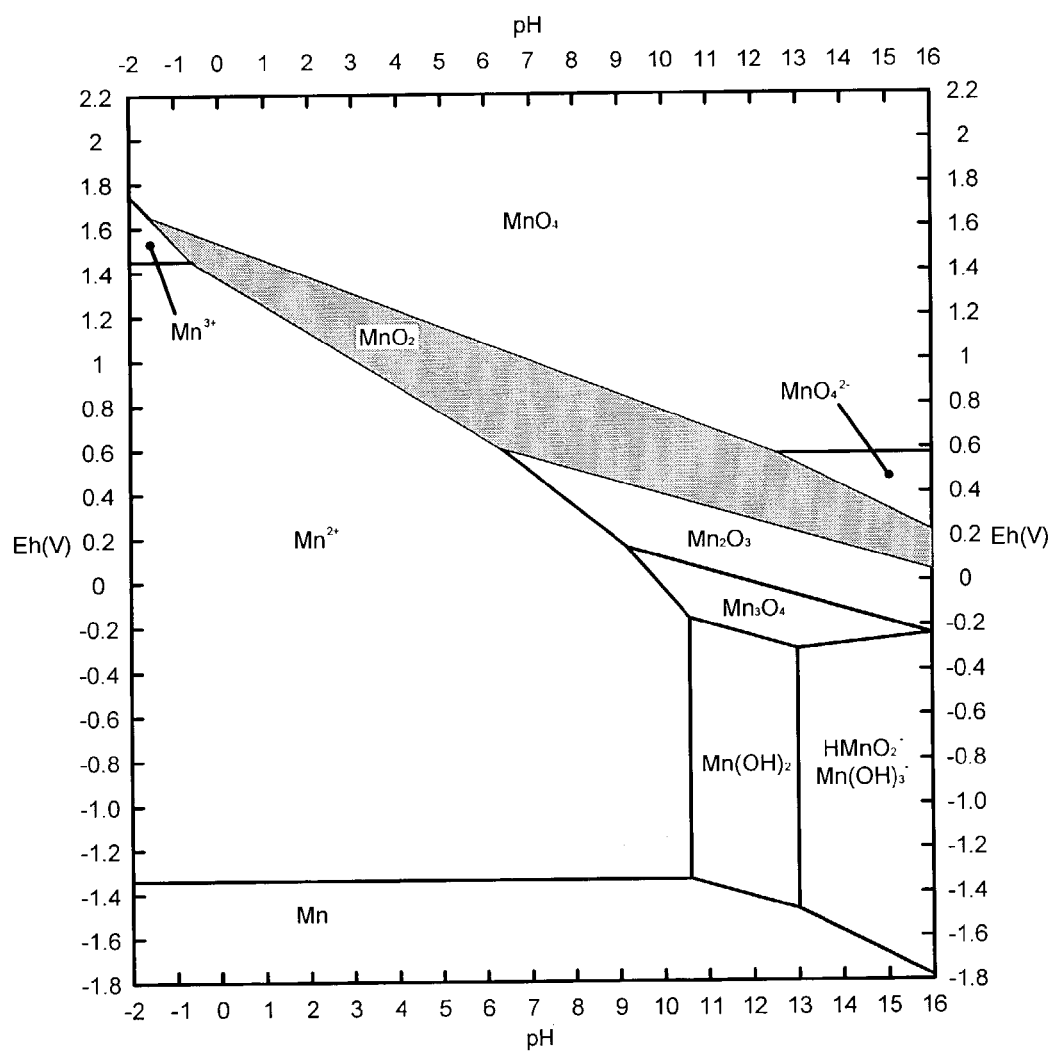
FIG. 10 is a Pourbaix diagram for an aqueous solution of $10^{-6}$ mole/liter manganese ion concentration.

In the treatment methods and systems disclosed herein, the oxidizer used to prepare the aqueous oxidizing solution, must be able to provide the required electrochemical (oxidizing) potential (Eh), within the specified pH range, to provide an Eh-pH combination to achieve stable solution equilibrium, as defined by the $MnO_2$ stability area as delineated in a Pourbaix diagram, such as those depicted in FIGS. 9 and 10. In a Pourbaix diagram, the $MnO_2$ stability area is defined by the thermodynamically stable ranges or boundaries of pH-Eh combinations that promote the existence and formation $MnO_2$ (Mn having valence state of +4) as the most thermodynamically stable form of manganese in an aqueous solution system. The domain of $MnO_2$ stability for an aqueous solution varies based upon the various components of the system. For example, changes in dissolved manganese ion concentration, solution temperature, and competing dissolved ions will affect the boundaries of stability for $MnO_2$. The effects of such changes upon the boundaries of the $MnO_2$ stability area on a Pourbaix Eh-pH diagram can be determined either by empirical data derived from experimentation or with computer software programs known to those skilled in the art, such as HSC Chemistry distributed by Outokumpu Oy of Finland. Software may also be written to determine the $MnO_2$ stability area as defined by other diagrams, such as the Latimer Diagram or the Frost Diagram.

In FIG. 9, ranges of pH and Eh values for thermodynamically stable aqueous solutions of various manganese compounds are illustrated in graph form for aqueous solution systems at 25° C. and a 1 mole/liter manganese ion concentration. FIG. 10 similarly illustrates ranges of pH and Eh values for aqueous solution systems at 25° C. but with a $1.0 \times 10^{-6}$ mole/liter manganese ion concentration. The Pourbaix Window diagrams depicted in FIGS. 9 and 10 were derived from the diagram presented in Atlas Of Electrochemical Equilibria in Aqueous Solutions," Marcel Pourbaix, pages 286–293, National Association of Corrosion Engineers, Houston, Tex.

The Eh and pH values as plotted on the graphs delineate the boundaries of the $MnO_2$ stability area for each of the two aqueous solution systems, emphasized with shading in FIGS. 9 and 10. A comparison of the boundaries of the two shaded areas on FIGS. 9 and 10 is illustrative of the different stability areas that exist under different system conditions.

Regardless of the specific system conditions, under the thermodynamically stable conditions for $MnO_2$ at a given pH and corresponding Eh range within the $MnO_2$ stability area or the given system conditions, the desired manganese valence state (theoretically +4) will exist. Thus, there is no propensity for Mn compounds in the +4 valence state to degrade to +3 or +2 valence states. Applicants have found that oxides of manganese treated in oxidizing solutions maintained within the $MnO_2$ stability area will exhibit a Mn valence state of close to +4, resulting in a $MnO_2$ with target pollutant loading capacities equal to and/or greater than (increased) the loading capacities of virgin or loaded oxides of manganese.

From the graph presented in FIG. 9 or 10, the thermodynamically stable ranges or boundaries of pH-Eh combinations for the particular aqueous system that will promote the existence and formation of $MnO_2$ can be identified. Through their understanding of the relationships between these system parameters of the $MnO_2$ stability area of a Pourbaix Window diagram and application thereof to conditions of a given aqueous system, Applicants are able to treat both virgin and loaded oxides of manganese sorbents so as to yield a treated sorbent, both pretreated and recycled, having equal or increased loading capacity when compared to the untreated sorbent.

Oxidizing solutions having the desired pH-Eh combination can be prepared, maintained or adjusted by increasing or decreasing oxidizer, acid, or base concentrations and/or temperature adjustment, as appropriate, so that the conditions are adjusted to remain within the $MnO_2$ stability area. With monitoring of Eh and pH data, an operator can make necessary adjustments in order to maintain or return the oxidizing solution to conditions within the $MnO_2$ stability area. Monitoring and adjusting can also be automated utilizing electronic sensors and controllers.

Virgin (unreacted) oxides of manganese sorbent particles may be treated or pretreated to increase the oxidation state and/or target pollution loading capacity. This can be accomplished by washing virgin (unreacted) sorbent with a wash solution of volume-to-sample weight ratio (liquid-to-solids ratio) of 2:1 or greater. However, effective treatment can also be accomplished with both lower and higher liquid-to-solids ratios as well. The sorbent powder is added to an aqueous oxidizing solution, for example a hypochlorite solution, stirred or agitated for a time sufficient to achieve an increased oxidation state and/or target pollution loading capacity. The then treated sorbent is separated by filtering, and the wet particles dried, which prepares the sorbent for target pollutant removal.

This method of virgin sorbent treatment may be better understood with reference to FIG. 1. Turning to FIG. 1 a virgin sorbent pretreatment system 10 is illustrated. The pretreatment system includes a washing unit 12, optionally equipped with pH probe 14 and Eh probe 16. As explained later in the specification, these probes may be utilized to provide information on aqueous solution conditions that may be utilized to provided manual or electronically controlled adjustments to relative to providing and maintaining the desire pH-Eh combination and other operating conditions. For example, temperature probe (not shown) may also optionally be provided. Virgin sorbent from virgin sorbent storage 18 is introduced into wash unit 12 along with an aqueous oxidizing solution prepared to have the desired pH-Eh combination within the $MnO_2$ stability area. Optionally, adjustments to the slurry pH and Eh can be made using appropriate oxidants for Eh adjustment and mineral acids and bases for pH adjustments.

The solid-liquid mixture or slurry is agitated or stirred and maintained at the desire operating conditions so as to increase the loading capacity and/or the Mn oxidation state. Optionally, adjustments to the slurry pH and Eh can be made using appropriate oxidants for Eh adjustment and mineral acids or bases for pH adjustment, so that the pH/Eh combination of the slurry is maintained within the window of $MnO_2$ stability for the specific system.

A filtration unit 22 configured for solid-liquid separation is next provided. Suitable filtration units known and readily identified by those skilled in the art may be utilized for filtration unit 22. The slurry from wash unit 12 is conveyed to filtration unit 22 where the treated sorbent is separated from the solution, with the wash solution or filtrate being routed for re-use, other processing or disposal. Since the filtrate may yet contain useful residual oxidizer, it may not be economic or desirable to dispose of the solution after a single use. However, after multiple uses, the solution may contain an accumulation of undesired constituents, such as contaminants and debris, that may be present in a load of virgin sorbent. Such undesired constituents may impact the efficiency or continued usefulness of the filtrate for subsequent sorbent pretreatment. At that juncture the filtrate may be disposed of or otherwise processed to recover useful values.

In any event, the treated sorbent that has been separated from the slurry is in the form of a wet sorbent cake and may be dried prior to use in a pollutant removal system such as the Pahlman™ system if the sorbent is to be fed dry into the removal system. In some removal systems the sorbent may be fed as a slurry or even as a wet sorbent cake and for such removal systems a drying step would not be required. However, where drying is required or desired prior to introduction into a pollution removal system, the wet sorbent cake is routed to a dryer 24. A variety of dryers known to those skilled in the art may be utilized for this purpose, such as a rotary kiln, heat exchanger, oven, or other suitable dryers. After drying the treated sorbent may require comminution and possible sieving to reduce the sorbent particles to the desired size. Further, the sorbent dryer 24 may be a standard cake or slurry drying system known to those skilled in the art of drying, which could include a fluidized bed dryer or a spray dryer, configured or designed to inject the wet cake or slurry of oxides of manganese sorbent into the flow of a gas stream prior to introduction into a reaction chamber of a pollutant removal system. Whether dried and comminuted or routed to a cake or slurry drying system, the resulting sorbent having increased loading capacity is ready for use in a pollution removal system Loaded (reacted) sorbent requires a different treatment in order to prepare it for reuse for target pollutant removal. Specifically, applicants have found it advantageous to rapidly remove the aqueous oxidizing solution from contact with the loaded sorbent being treated during washing once dissolved reaction products, such as soluble salts, have disassociated into solution. Applicants believe that such rapid removal of soluble salts is necessary in order to prevent possible re-deposition of a reaction product coating or layer, through precipitation of reaction products, e.g., sulfate and nitrate compounds or their derivatives, upon the washed oxides of manganese sorbent particles. Such coatings are believed to be detrimental to target pollutant removal efficiency of the sorbent. In order to prevent re-deposition of such coatings or layer, the washing or rinsing equipment is configured to prevent buildup of high dissolved salt concentrations and avoids prolonged sorbent contact with the wash solutions used.

Prolonged sorbent-solution contact should be avoided for another reason. As the reaction products are dissolved into solution, the acidity of the wash solution has been observed to increase, perhaps having a pH as low as 2.0–4.0, as a result of sulfate and nitrate salts, for example, combining with wash solution to form weak acids. Such pH shifts during washing can and oxidizing of loaded sorbent can take the oxidizing solution outside of the $MnO_2$ stability area At the lower pH ranges, as illustrated in the Pourbaix Window diagram of FIG. 9, an upward, sometimes significant, Eh adjustment would be required to remain within the $MnO_2$ stability area. Base could also be added to accomplish the desired adjustment; however, this will be ineffective if the oxidizer has been depleted, requiring oxidizer addition. As some oxidizers or oxidants are inexpensive, such Eh adjustment can be uneconomic. However, if not otherwise made, a treated sorbent with a lower valance state and/or loading capacity would result. Through avoidance of prolonged contact potentially, costly Eh adjustments and pH adjustments can be avoided or minimized and a treated sorbent with increased loading capacity can be obtained.

Rapid filtration can be accomplished by various methods such as vacuum or pressure filtration. On the laboratory scale, rapid filtration can be accomplished by placing the loaded oxides of manganese sorbent to be washed on a filter media, using an apparatus such as a Beuchner funnel, and maintaining a vacuum to the filter while applying the wash solution onto the loaded oxides of manganese sorbent. This results in rapid filtration of wash solutions through the sorbent, accompanied by rapid transport of dissolved salts away from the washed sorbent.

Loaded oxides of manganese sorbent samples are washed with an oxidizing wash solution of volume-to-sample weight ratio (liquid-to-solids ratio) of between 2:1 and 50:1 or greater, preferably 25:1 to 35:1. Within these liquid-to-solid ratios and with rapid filtration, effective dissolution and rapid removal of reaction products can be achieved, resulting in a treated or recycle processed (sometimes referred to as regenerated) sorbent having an increased oxidation state and/or target pollution loading capacity.

Figure 2:
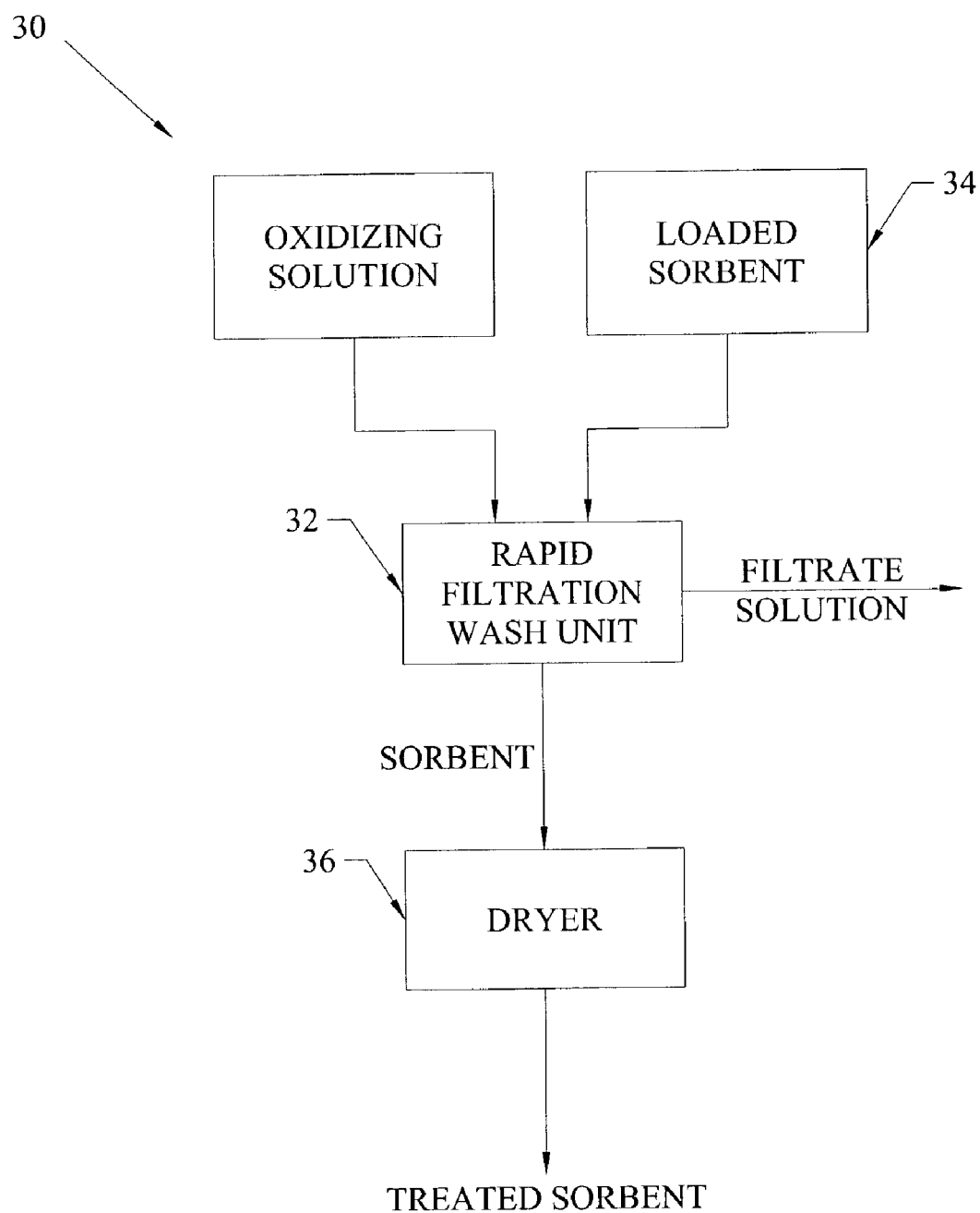
FIG. 2 is a block flow diagram depicting an embodiment of a treatment system and method of the invention.

The system and method of recycle processing of loaded sorbent can be understood with reference to FIG. 2. Turning to FIG. 2 a loaded sorbent treatment or recycle processing system 30 is illustrated. The system 30 includes a combination rapid filtration wash unit 32. The wash unit 32 is configured to receive loaded sorbent from loaded sorbent storage 34 and to aqueous oxidizing solution. The wash unit 32 is further configured and operated so as to avoid and pooling of oxidizing solution or creation of a liquefied slurry or other conditions that would lead to prolonged solid-liquid contact such that the solution no longer remains within the $MnO_2$ stability area. Devices such as moving belt filters presses, filter presses, and filter drum presses or pressurized or vacuum filters or other such devices known to those skilled in the art for rapid filtration washing can be used for rapid filtration wash unit 32.

Loaded sorbent is introduced into rapid-wash filtration unit 32 from loaded sorbent storage 34. An aqueous oxidizing solution prepared to have the desired pH-Eh combination within the $MnO_2$ stability area is then passed over and through the loaded sorbent with rapid filtration. The aqueous oxidizing solution may be monitored and adjusted prior to application to the loaded sorbent and the Eh and pH of the filtrate may be monitored. However, monitoring is not really required as long as there is no pooling so as to cause undesirable prolonged solid-liquid contact. Once the load sorbent had been washed for a time sufficient to restore or increase the loading capacity and/or Mn oxidation state, solution is no longer applied and the wet sorbent cake is routed to dryer 36. The same types and variety of dryers suitable as dryer 24 in the virgin sorbent pretreatment system 10 are suitable for use as dryer 36 in the loaded sorbent treatment system 30. And similarly, the selection will depend upon whether the recycle processed sorbent is to be introduced into a pollutant removal system dry or as a wet sorbent cake. If to be introduced dry, with comminution and possibly sieving, as necessary, the treated or recycle processed loaded sorbent is ready for re-introduction into a pollutant removal system.

It should be noted that the embodiment of the system of the invention in FIG. 2 may be utilized for treatment of virgin oxides of manganese as well, even though prolonged liquid-solid contact need not be avoided for pretreatment. Thus, virgin sorbent may be treated in the system depicted in either FIG. 1 or FIG. 2 and by the same method as loaded sorbent.

Figure 7:
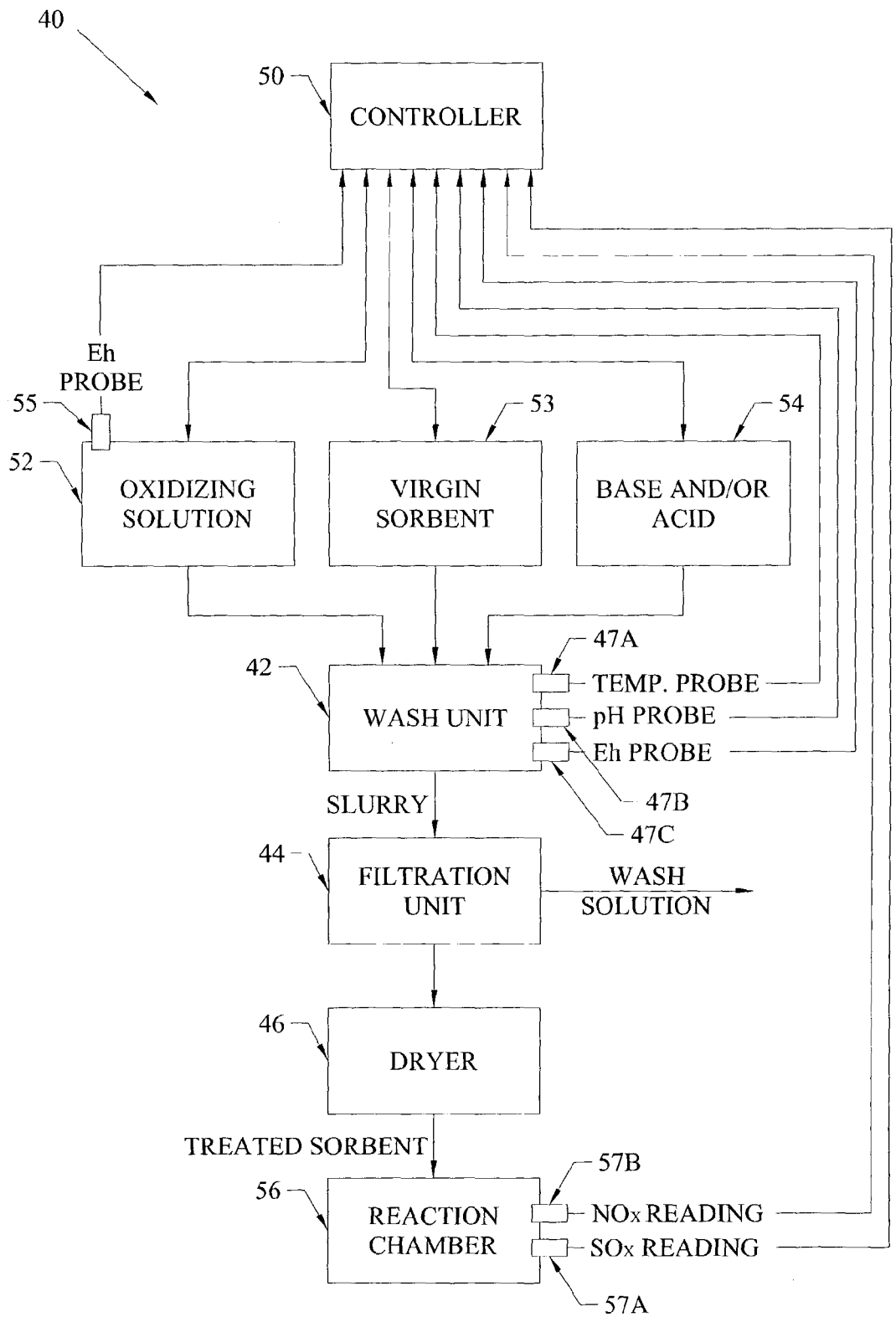
FIG. 7 is a block flow diagram of a treatment system and method of the invention incorporating a controller.
Figure 8:
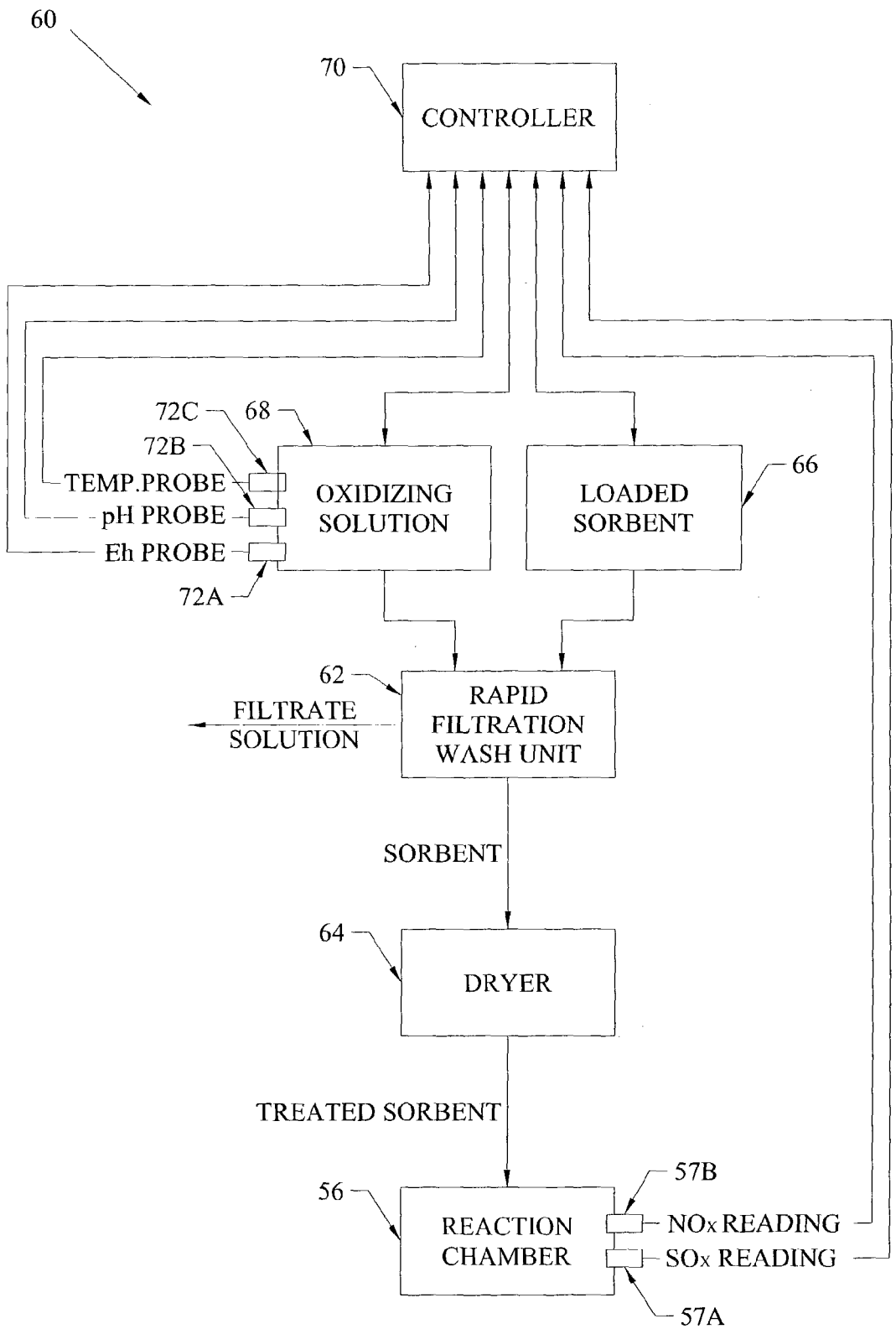
FIG. 8 is a block flow diagram of a embodiment of a treatment system and method of the invention incorporating a controller.

Respectively, FIGS. 7 and 8 illustrate embodiments of the invention incorporating electronic controller to provide integrated simultaneous monitoring and adjustment of operational parameters for treatment of oxides of manganese with option feed back loop for checking the loading capacity of the treated sorbent.

With reference to FIG. 7, the pretreatment system 40, illustrated in block flow, has a wash unit 42, a filtration unit 44, and a dryer 46. Wash unit 42 is equipped with temperature probe 47A, pH probe 47B and Eh probe 47C which are in electronic communication with a controller 50. A vessel 52 containing oxidizing solution is configured to feed oxidizing solution to wash unit 42. Virgin sorbent vessel 53 containing virgin sorbent is configured to feed virgin sorbent to wash unit 42. Acid and/or base vessel 54 is configured to feed acid and or base to wash unit 42. The feeders (not shown) of vessels 52, 53 and 54 are in electronic communication with the controller 50. The controller is also in electronic communication with the Eh probe 55 with which the oxidizing solution vessel 53 is equipped. As illustrated treated sorbent from dryer 46 is routed to reaction chamber 56. Alternatively, sorbent from dryer 46 may be routed for storage or to a sorbent feeder prior to introduction to the reaction chamber 56. Reaction chamber 56 represents a pollution removal system or a reaction zone of a pollution removal system such as a Pahlman™ dry removal system described in co-pending U.S. patent application Ser. Nos. 09/919,600, 09/951,697, 10/044,089 and 10/025,270 or any other pollution control system that utilizes oxides of manganese as a sorbent for removal of target pollutants from gas streams. Reaction chamber 56 is equipped with optional target pollutant concentration readers or continuous emission monitors (CEMS) for $NO_x$ and $SO_x$ readers 57A and 57B in electronic communication with controller 50.

The controller 50 interfaces with probes 47A–47C, readers 57A, 57B and the feeders of the vessels 52–54 for measurement and adjustment of operational parameters with in the pretreatment system. These parameters are important in determining the proper Eh of the aqueous oxidizing solution prior to addition to the washing unit 42 and the conditions in the washing unit 42 when the virgin sorbent is added. Eh probe 55 is in communication with controller 50 to adjust the Eh of oxidizing solution vessel 52. The controller 50 adds oxidant to vessel 52 until the desired Eh reading is abtained prior to addition to the wash unit 42. The temperature, pH, and Eh of the washing unit are monitored and adjusted so as to maintain conditions within the $MnO_2$ stability area.

The controller 50 contains a programmable logic controller (PLC) and other hardware components necessary for the operation of the controller such as a power supply, input and output nodules that would communicate with the probes 47A–47C and/or readers 57A, 57B, and the feeders of the vessels 52–54. The controller 50 receives inputs from the various probes and readers and converts them into ladder logic language that would be used by an internal proportional integral derivative (PID) loop to individually and simultaneously monitor system operational parameters and to reconcile the inputs with predetermined or computer generated calculated set points for the operational parameters, such as temperature, and Eh and pH levels. As determined by computer logic, the controller 50 will send an output as necessary to any of the feeders of vessels 52–53 signaling a feeder to cycle on or to change feeder rate so as to maintain or adjust system operational parameters to within the $MnO_2$ stability area. The controller 50 may also contain an Ethernet card or other component that allows onsite or offsite remote display and operator interface and control as needed.

The controller 50 would be given a start command and direct the feeders of vessels 52 and 53 to inject, respectively, a predetermined amounts of virgin sorbent and oxidizing solution into the washing unit 42. The controller would signal the feed of a predetermined amount of oxidant into the aqueous oxidizing solution vessel checking and or adjusting the Eh and/or pH of the solution prior to feeding into the washing unit. The Eh of the oxidizing solution in vessel 52 may be adjusted by addition of an oxidizer in sufficient quantity as to raise the Eh to the desired level from an oxidizer vessel, not shown in FIG. 7, containing a supply of oxidizer. As determined by programmed controller logic, the controller 50 would also check, based on inputs received from the probes 47A–47C and/or adjust the conditions of the washing unit by adjusting the temperature utilizing a heater or heat exchanger (not shown in FIG. 7) to increase or decrease solution temperature; the pH, if needed, by increasing or decreasing the rate of base or acid feed; and the Eh, if needed, by increasing or decreasing the oxidizer concentration of the aqueous oxidizing solution. An optional, final quality control loop may be provided utilizing the readers 57A, 57B checking the loading performance of the treated sorbent by sending, for example, SOx and NOx readings back to the controller 50. As determined by controller logic, the controller 50 would then adjust the washing unit parameters, if needed, to provide treated oxides of manganese having increased loading capacity as compared to the untreated virgin sorbent contained in vessel 53. The same controller may also be used to control the entire operation of both the reaction chamber 56 and the pretreatment system 40, or separate controllers may be provided.

With reference to FIG. 8, a recycle processing or regeneration system 60, for treating loaded sorbent is illustrated as a block flow diagram. The regeneration system 60 has a rapid filtration wash unit 62 from which treated sorbent is routed to dryer 64. The filtrate from wash unit 62 is directed for disposal or for other processing to recover useful values therein. Loaded sorbent vessel 66 is configured to feed loaded sorbent to wash unit 62. An oxidizing solution vessel 68 containing oxidizing solution is configured to feed oxidizing solution to wash unit 62. The feeders (not shown) of vessels 66, 68 are in electronic communication with the controller 70. Vessel 68 is equipped with an Eh probe 72A and pH probe 72B which are also in electronic communication with the controller 70. As illustrated, treated sorbent from the dryer 64 is routed to a reaction chamber 56. It being understood that, as in pretreatment system of FIG. 7, the treated sorbent may be routed to a sorbent feeder or to a sorbent storage bin. Similarly, optional readers 57A, 57B are in electronic communication with controller 70, providing a optional control loop to check loading performance of treated sorbent.

The controller 70 interfaces with the Eh probe 72A, pH probe 72B, temperature probe 72C, the readers 57A, 57B, and the feeders of the vessels 66, 68 to monitor and adjust the operational parameters of pH, Eh and temperature within the regeneration system 60. Additionally, the controller 70 interfaces with a vessel (not shown in FIG. 8) and the feeder thereof to provide acid or base as necessary to the aqueous oxidizing solution. It is important to determine and adjust, as necessary, the operational parameters prior to introducing the oxidizing solution into wash unit 62 in order to assure that conditions of the oxidizing solution are within the $MnO_2$ stability area.

The controller 70 contains a programmable logic controller (PLC) and other components that would be necessary for the operation of the controller such as a power supply, input and output modules that would communicate with the probes 72A, 72B, 72C, the readers 57A, 57B and the feeders that supply the loaded sorbent, the aqueous oxidizing solution, and acid or base. The controller 70 receives inputs from the various probes and readers and convert them into ladder logic language that would be used by the internal proportional integral derivative (PID) loop to individually or simultaneously monitor system operational parameters and to reconcile the inputs with predetermined or computer generated calculated set points for the operational parameters. The controller 70 may also contain an Ethernet card or other component that allows onsite or offsite remote display and operator interface and control as needed. Such integrated control of the regeneration system allows a practical alternative to manual adjustments by an operator and lends itself to automation of the regeneration system even from remote locations.

The controller 70 would be given a start command and signal the feeders of the vessels 66, 68, simultaneously or in desired sequence, to inject a predetermined amount of loaded sorbent and oxidizing solution into rapid filtration wash unit 62. In order to maintain conditions of the solution within the $MnO_2$ stability area, the controller 70 would, as necessary, signal feed of a predetermined amount of oxidizer, acid or base into the aqueous oxidizing solution in vessel 68, regularly monitoring and/or adjusting the Eh and/or pH of the solution prior to being fed into the washing unit. As determined by the controller logic, the controller 70 would also check, based on inputs received from the probes 72A, 72B, 72C, and/or adjust the conditions of the aqueous oxidizing solution in vessel 68 by adjusting the temperature utilizing a heater or heat exchanger (not shown in FIG. 8) to increase or decrease solution temperature; the pH, if needed, by increasing or decreasing the rate of base or acid feed; and the Eh, if needed, by increasing or decreasing the oxidizer concentration of the aqueous oxidizing solution.

As in the pretreatment system, an optional, final quality control loop may be provided utilizing the readers 57A, 57B, checking the loading performance of the treated sorbent by sending, for example, SOx and NOx readings back to the controller 70. As determined by controller logic, the controller 70 would then adjust oxidizing solution parameters, if needed, to provide treated oxides of manganese having increased loading capacity as compared to the untreated loaded sorbent contained in vessel 66. The same controller may also be used to control the entire operation of both the reaction chamber 56 and the treatment system 40, or separate controllers may be provided.

Applicants conducted a series of lab-scale tests utilizing a live slipstream of an actual exhaust gas from a coal-fired combustion source in order to demonstrate the increased loaded capacity achieved with the invention. A glass reactor designed to mimic the gas-solid interactions known to be present in the reaction zones of a Pahlman™ dry target pollutant removal system was utilized for the tests. The glass reactor was a vertically positioned Pyrex™ glass cylinder having an internal diameter of 2 inches and a length of approximately 18 inches. For each test run, 50.0 grams of oxides of manganese were suspended in the reactor using a permeable fritted glass filter positioned approximately 4 inches from the bottom of the reactor, allowing for flow of the gas stream through the reactor while keeping the oxides of manganese suspended. The test reactor was insulated and configured with thermocouples for temperature readings and heating elements for temperature control to maintain a temperature set point, which in the purposes of the conducted testes was 250° F.

A NOx and $SO_2$ laden gas stream was pumped into the bottom of the test reactor at a flow rate which provided adequate fluidization of the bed of sorbent to promote optimal gas/solids contact. The reactor was heated during the testing to 250° F. and the gas flow rate was metered at a constant 6.5 liters per minute (lpm). The slipstream of actual exhaust gas was from a 570 MW tangentially-fired coal-burning boiler operating on Powder River Basin (PRB) western coal.

The composition of the exhaust gas was measured both on the inlet and outlet of the test reactor with appropriate gas analyzers, as one skilled in the art would employ and for the test run examples presented found to be within the following ranges: Oxygen ($O_2$) 6–7%, carbon dioxide ($CO_2$) 10–12%, oxides of nitrogen (NOx) 190–250 ppm, sulfur dioxide ($SO_2$) 400–500 ppm. The composition of the inlet gas to the test reactor varied slightly from test to test, therefore the data was normalized and presented as pounds (lbs) of NOx or $SO_2$ into and out of the test reactor. The extent of NOx and $SO_2$ loading was then calculated to determine the effectiveness of the aqueous oxidizing rinse. The slipstream was passed through the fluidized bed of oxides of manganese, where the flow carried a portion of the sorbent up onto the filter, thus creating a filter cake, which mimics a bag house reaction chamber of a Pahlman™ dry target pollutant removal system.

Figure 3:
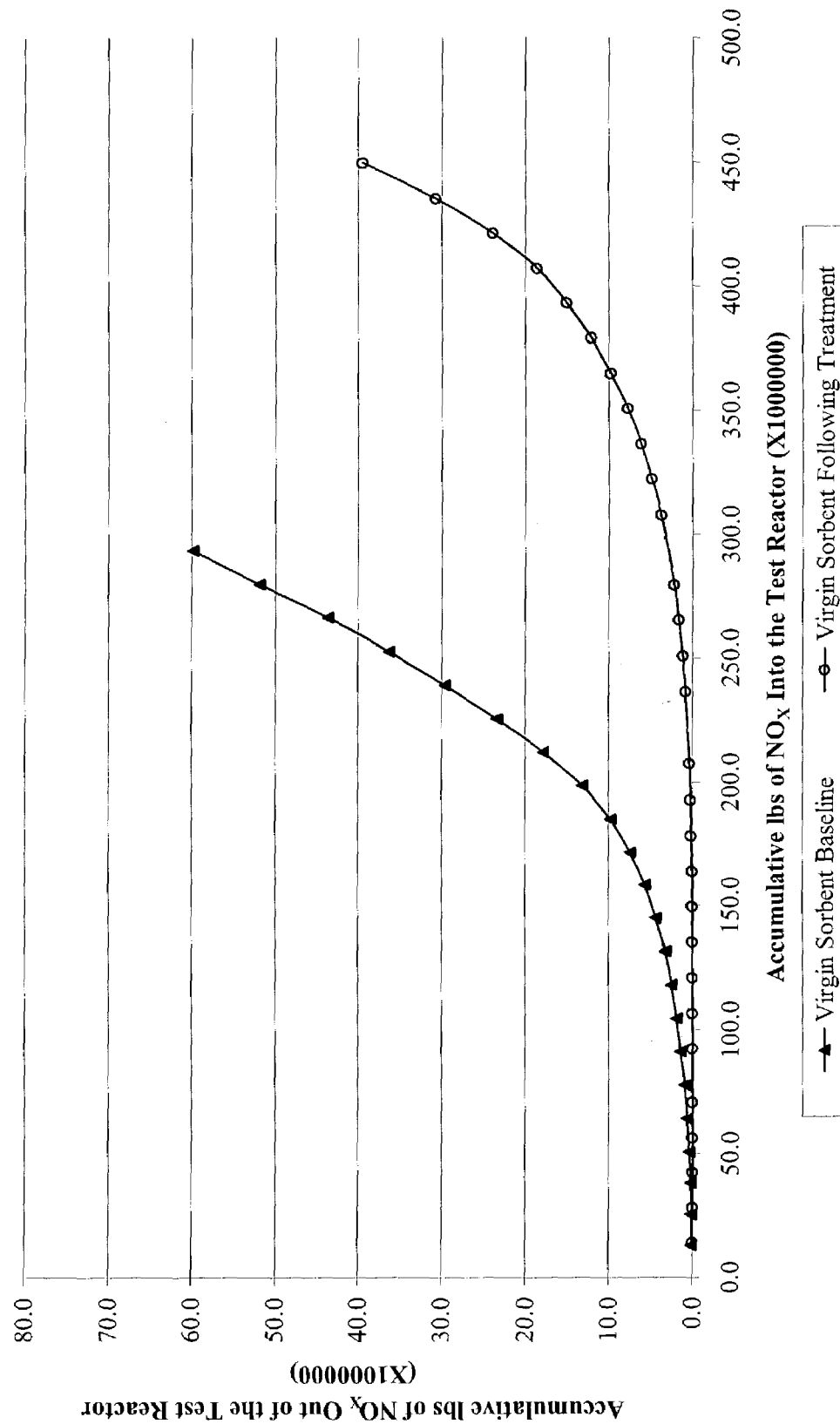
FIG. 3 is a sorbent loading graph.
Figure 4:
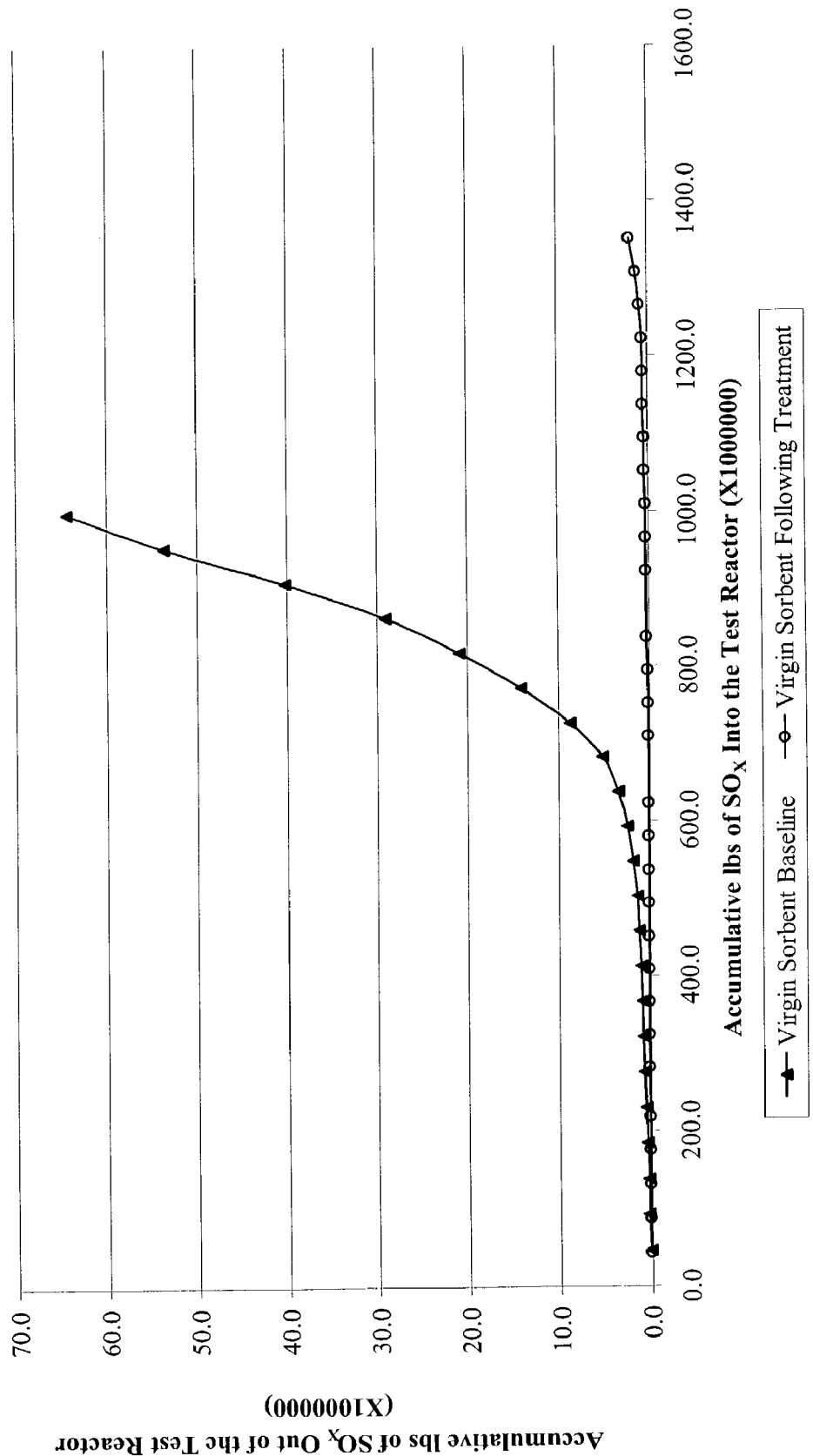
FIG. 4 is a sorbent loading graph.

$SO_2$ and $NO_x$ concentrations were measured continuously alternating from the reactor inlet and outlet utilizing a continuous emissions monitoring system (CEMS). $SO_2$ concentrations were measured utilizing a Bovar Western Research model 921NMP spectrophotometric instrument and $NO_x$ concentrations were measured utilizing a Thermo Electron model 42H chemiluminescent instrument. In order to obtain accurate and reliable emission concentrations, sampling and reporting was conducted in accordance with US EPA Reference CFR 40, Part 60, Appendix A, Method 6C. Inlet gas temperature was 250° F., with a differential pressure across the permeable fritted glass filter was 2.00" of WC. FIGS. 3 and 4 show the results of comparative test runs conducted utilizing 650 g of each of virgin EMD type oxides of manganese sorbent, to provide a baseline, and treated virgin EMD type oxides of manganese sorbent prepared according to the invention. The treated virgin EMD type oxides of manganese sorbent sample was prepared by first treating with an aqueous oxidizing solution of 0.01% sodium hypochlorite (NaOCl). The measured pH and Eh values of the starting aqueous oxidizing solution of 0.01% sodium hypochlorite (NaOCl) were 8.5 and 900 mV respectively, which provided a solution within the $MnO_2$ stability area. A quantity of virgin EMD type oxides of manganese sorbent (75.3 g) was then added to a mixing beaker of 151 g of the aqueous oxidizing solution of 0.01% sodium hypochlorite (NaOCl). The slurry was then continually stirred for a period of 15 minutes while recording data on the changing pH and Eh of the solution. The starting pH of 8.5 quickly dropped to 6.2 within the first minute of mixing and after 15 minutes had dropped to 6.1. The Eh which started at 900 mV rose to 1040 mV within the first minute of mixing then started slowly dropping in about even increments to a finial value of 885 mV after 15 minutes. The slurry was then placed in a paper filter to separate the solids from the filtrate. The now treated EMD type oxides of manganese sorbent was then placed in a drying oven and dried for 5 hrs at 185° F. (85° C.). The dried sorbent was then gently deagglomerated and 50 g were then placed in the laboratory test reactor for subsequent target pollutant loading, the measured data points are plotted and identified in FIGS. 3 and 4 as "Virgin Sorbent Following Treatment". Along with the treated virgin EMD type sorbent loading rates, data points from untreated virgin EMD type oxides of manganese sorbent are alos plotted in FIGS. 3 and 4 as "Virgin Sorbent Baseline" to provide a baseline for loading capacity comparison.

FIG. 3 shows the NOx loading curves. Looking at the virgin sorbent baseline, the virgin EMD type sorbent was at least achieving 90% NOx removal on a ppm basis for 24 minutes, during which time an accumulative total of $158 \times 10^{-6}$ pounds of NOx entered into the laboratory test reactor with only $5.6 \times 10^{31\ 6}$ pounds of NOx exiting the reactor, for a total of $152.4 \times 10^{-6}$ pounds of NOx being captured by the virgin EMD type oxides of manganese sorbent. The treated virgin EMD type sorbent is shown to exhibit substantially improved loading rates. NOx removal time at a $NO_x$ removal rate of at least 90% was increased to 47 minutes. For comparison, an accumulative total of $331 \times 10^{-6}$ pounds of NOx entered the laboratory test reactor with only $6.1 \times 10^{-6}$ pounds of NOx exiting the reactor for a total of $324.9 \times 10^{-6}$ pounds of NOx being captured by the treated virgin EMD type oxides of manganese sorbent FIG. 4 shows the $SO_2$ loading curves. Looking at the virgin sorbent baseline, the virgin EMD type sorbent was at least achieving 99% $SO_2$ removal on a ppm basis for 24 minutes, during which time an accumulative total of $548 \times 10^{-6}$ pounds of $SO_2$ entered into the laboratory test reactor with only $1.9 \times 10^{-6}$ pounds of $SO_2$ exiting the reactor, for a total of $546.1 \times 10^{-6}$ pounds of $SO_2$ being captured by the virgin EMD type oxides of manganese sorbent. The treated virgin EMD type sorbent is shown to exhibit substantially improved loading rates. $SO_2$ removal time a a removal rate of at least 99% was increased to 61 minutes. For comparison, an accumulative total of $1266 \times 10^{-6}$ pounds of $SO_2$ entered the laboratory test reactor with only $0.9 \times 10^{-6}$ pounds of $SO_2$ exiting the reactor, for a total of $1265.1 \times 10^{-6}$ pounds of $SO_2$ being captured by the treated virgin EMD type oxides of manganese sorbent.

Figure 5:
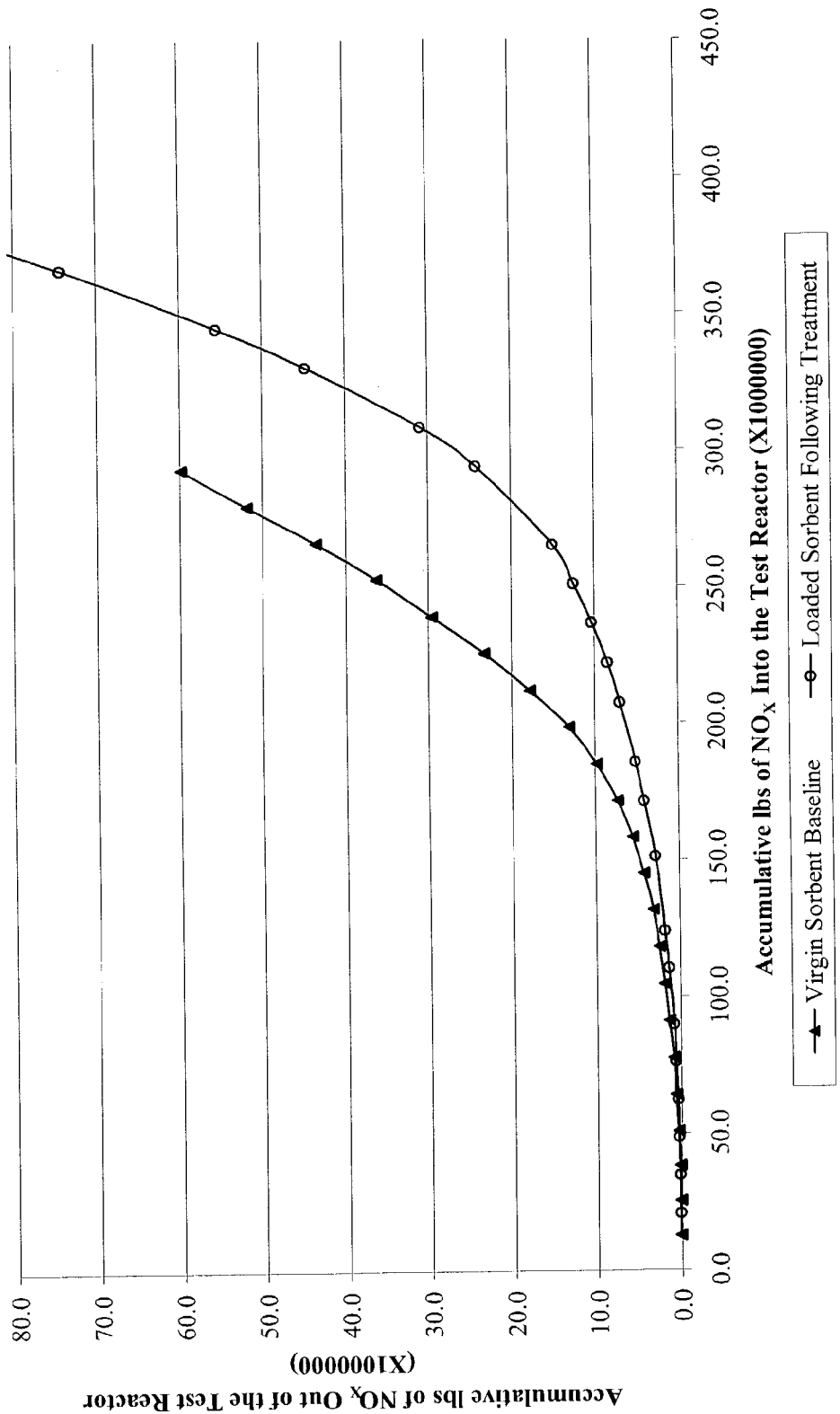
FIG. 5 is a sorbent loading graph.
Figure 6:
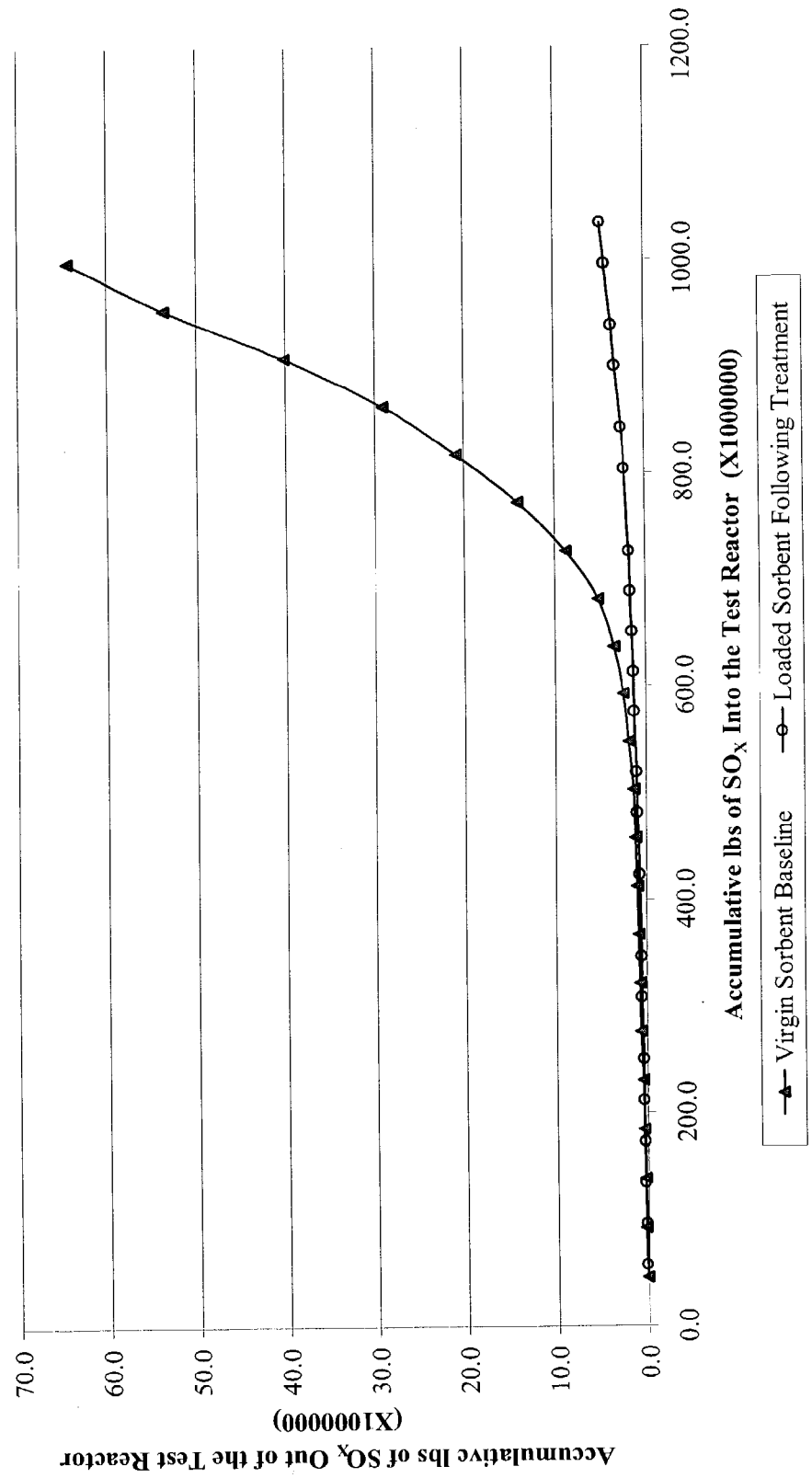
FIG. 6 is a sorbent loading graph.

FIGS. 5 and 6 show the results of comparative test runs conducted utilizing 50 g of each of virgin EMD type oxides of manganese sorbent, to provide a baseline, and treated loaded EMD type oxides of manganese sorbent prepared according to the invention. The treated loaded EMD type sorbent sample was first treated with an aqueous oxidizing solution of 0.01% sodium hypochlorite (NaOCl). The measured pH and Eh values of the starting aqueous oxidizing solution of 0.01% sodium hypochlorite (NaOCl) were 8.9 and 900 mV respectively, which provided a solution within the $MnO_2$ stability area. A quantity of loaded EMD type oxides of manganese sorbent (98.8 g) was evenly distributed on moistened filter paper, which was placed in a Beuchner funnel. After applying vacuum, a first quantity of 1650 ml of aqueous oxidizing solution of 0.01% sodium hypochlorite (NaOCl) was evenly applied to the loaded EMD type sorbent surface at a rate such that no solution pooling was allowed to take place. The filtrate was then collected and the pH and Eh was measured to be 2.8 and 1070 mV respectively. A second quantity of 1650 ml of an aqueous oxidizing solution of 0.01% sodium hypochlorite (NaOCl) was again evenly applied to the loaded sorbent surface at a rate such that no solution pooling was allowed to take place. The second filtrate was then found to have a pH of 2.8 and an Eh of 1100 mV. The now treated EMD type oxides of manganese sorbent was then placed in a drying oven and dried for 2 hrs at 185° F. (85° C.). The dried sorbent was then gently deagglomerated and 50 g were then placed in the laboratory test reactor for subsequent target pollutant loading, the measured data points are plotted and identified in FIGS. 5 and 6 as "Loaded Sorbent Following Treatment." The data points from untreated virgin EMD type oxides of manganese sorbent are plotted in FIGS. 5 and 6 as "Virgin Sorbent Baseline" to provide a baseline for loading capacity comparison.

FIG. 5 shows the NOx loading curves. Looking at the virgin sorbent baseline, the EMD type sorbent was at least achieving 90% NOx removal on a ppm basis for 24 minutes, during which time an accumulative total of $158 \times 10^{-6}$ pounds of NOx entered into the laboratory test reactor with only $5.6 \times 10^{-6}$ pounds of NOx exiting the reactor, for a total of $152.4 \times 10^{-6}$ pounds of NOx being captured by the virgin EMD type oxides of manganese sorbent. The loaded EMD type sorbent following treatment is shown to exhibit substantially improved loading rates. NOx removal time at a removal rate of at least 90% was increased to 32 minutes. For comparison, an accumulative total of $222 \times 10^{-6}$ pounds of NOx entered the laboratory test reactor with $8.4 \times 10^{-6}$ pounds of NOx exiting the reactor, for a total of $213.6 \times 10^{-6}$ pounds of NOx being captured by the treated loaded EMD type oxides of manganese sorbent.

FIG. 6 shows the $SO_2$ loading curves. Looking at the virgin sorbent baseline, the EMD type sorbent was at least achieving 99% $SO_2$ removal on a ppm basis for 24 minutes, during which time an accumulative total of $548 \times 10^{-6}$ pounds of $SO_2$ entered into the laboratory test reactor with only $1.9 \times 10^{-6}$ pounds of $SO_2$ exiting the reactor, for a total of $546.1 \times 10^{-6}$ pounds of $SO_2$ being captured by the virgin EMD type oxides of manganese sorbent. The treated loaded EMD type sorbent is shown to exhibit substantially improved loading rates. $SO_2$ removal time at a rate of at least 99% was increased to 47 minutes. For comparison, an accumulative total of $901 \times 10^{-6}$ pounds of $SO_2$ entered the laboratory test reactor with only $3.2 \times 10^{-6}$ pounds of $SO_2$ exiting the reactor, for a total of $897.8 \times 10^{-6}$ pounds of $SO_2$ being captured by the treated loaded EMD type oxides of manganese sorbent.

The data from the lab-scale tests presented in FIGS. 3–6 illustrate the increased loading capacity that is achievable with the invention.

While exemplary embodiments of this invention and methods of practicing the same have been illustrated and described, it should be understood that various changes, adaptations, and modifications might be made therein without departing from the spirit of the invention and the scope of the appended claims.

What is claimed is:

1. A process for pretreatment of virgin oxides of manganese for use as a sorbent to remove target pollutants from a gas stream, comprising the steps of:
   a. washing virgin oxides of manganese in wash unit with an aqueous oxidizing solution, the solution having Eh and pH values within the $MnO_2$ stability area; and
   b. filtering the washed oxides of manganese to form a filtrate and a pretreated oxides of manganese filter cake, the oxides of manganese of the filter cake having a pollutant loading capacity greater than the pollutant loading capacity of the virgin oxides of manganese.

2. A process for pretreatment of virgin oxides of manganese for use as a sorbent to remove target pollutants from a gas stream, comprising the steps of:
   a. washing virgin oxides of manganese in a wash unit with an aqueous oxidizing solution, the solution having Eh and pH values within the $MnO_2$ stability area;
   b. monitoring and adjusting the pH and/or the Eh values of the solution so as to maintain the Eh and pH values of the solution within the $MnO_2$ stability area; and
   c. filtering the washed oxides of manganese to form a filtrate and a pretreated oxides of manganese filter cake, the oxides of manganese of the filter cake having a pollutant loading capacity greater than the pollutant loading capacity of the virgin oxides of manganese.

3. A process for pretreatment of virgin oxides of manganese for use as a sorbent to remove target pollutants from a gas stream, comprising the steps of:
   a. washing virgin oxides of manganese in a rapid filtration wash unit with an aqueous oxidizing solution to form a filtrate and a pretreated oxides of manganese filter cake, the solution having Eh and pH values within the $MnO_2$ stability area; and
   b. removing the pretreated oxides of manganese filter cake from the rapid filtration unit, the oxides of manganese of the filter cake having a pollutant loading capacity greater that the pollutant loading capacity of the virgin oxides of manganese.

4. A process for regeneration of loaded oxides of manganese formed through reaction between unreacted oxides of a manganese and target pollutants in a gas stream, comprising the steps of:
   a. washing loaded oxides of manganese in a rapid filtration wash unit with an aqueous oxidizing solution having Eh and pH values within the $MnO_2$ stability area to form a filtrate and a regenerated oxides of manganese filter cake; and
   b. removing the regenerated oxides of manganese filter cake from the rapid filtration unit, the oxides of manganese of the filter cake having a pollutant loading capacity equal to or greater than the pollutant loading capacity of the unreacted oxides of manganese from which the loaded oxides of manganese are formed.

5. A process for regeneration of loaded oxides of manganese sorbent particles bearing a reaction product layer of the surface thereof formed during reaction between unreacted oxides of manganese sorbent particles and target pollutants in a gas stream in a pollution removal system, comprising the steps of:
   a. rapidly washing and filtering the loaded oxides of manganese sorbent particles in a rapid filtration wash unit with an aqueous oxidizing solution to dissolve the reaction product layer from the surface of the loaded oxides of manganese sorbent particles into the solution to form a filtrate and a regenerated oxides of manganese filter cake, the solution having Eh and pH values within the $MnO_2$ stability area; and b. removing the regenerated oxides of manganese filter cake from the rapid filtration unit, the oxides of manganese of the filter cake having a pollutant loading capacity equal to or greater than the pollutant loading capacity of the unreacted oxides of manganese sorbent particles from which the loaded oxides of manganese sorbent particles are formed.

6. The process of any one of claims 1 to 5, further comprising the steps of:
   drying the filter cake; and
   comminuting and sizing the dried filter cake to provide oxides of manganese particles.

7. The process of any one of claims 1 to 5, further comprising the steps of:
   drying the filter cake;
   comminuting and sizing the dried filter cake to provide oxides of manganese particles for introduction into a feeder or reaction chamber of a dry pollution removal system.

8. The process of any one of claims 1 to 5, further comprising the steps of:
   drying the filter cake;
   comminuting and sizing the dried filter cake to provide oxides of manganese particles for introduction into a feeder or reaction chamber of a dry pollution removal system; and
   introducing the comminuted and sized oxides of manganese particles into the feeder or reaction chamber.

9. The process of any one of claims 1–5, further comprising the step of:
   conveying the filter cake to a dryer configured to inject a wet filter cake or a slurry of oxides of manganese sorbent into a flow of a gas stream prior to introduction into a reaction chamber of a pollutant removal system.

10. The process of any one of claims 1–5, further comprising the steps of:
    conveying the filter cake to a dryer configured to inject a wet filter cake or a slurry of oxides of manganese sorbent into a flow of a gas stream prior to introduction into a reaction chamber of a pollutant removal system; and
    injecting the wet filter cake or the slurry into the reaction chamber.

11. The process of claim 2, wherein the monitoring and adjusting step is carried out by a controller capable of individually or simultaneously monitoring and adjusting system operational parameters, the controller providing integrated control within the wash unit of the temperature, Eh values, and pH values in order to maintain conditions of the aqueous oxidizing solution within the $MnO_2$ stability area.

12. The process of anyone of claims 1–5, wherein the aqueous oxidizing solution contains an oxidizer selected from the group consisting of hypochlorites, chlorates, perchlorates, permanganates, oxygen ($O_2$), air, ozone, peroxides, persulfates, and combinations thereof.

* * * * *